United States Patent
Haochen et al.

(10) Patent No.: US 12,423,961 B2
(45) Date of Patent: Sep. 23, 2025

(54) PROVABLE GUARANTEES FOR SELF-SUPERVISED DEEP LEARNING WITH SPECTRAL CONTRASTIVE LOSS

(71) Applicants: TOYOTA RESEARCH INSTITUTE, INC., Los Altos, CA (US); THE BOARD OF TRUSTEES OF THE LELAND STANFORD JUNIOR UNIVERSITY, Stanford, CA (US)

(72) Inventors: Jeff Z. Haochen, Stanford, CA (US); Colin Wei, Pleasanton, CA (US); Adrien David Gaidon, San Jose, CA (US); Tengyu Ma, Stanford, CA (US)

(73) Assignees: TOYOTA RESEARCH INSTITUTE, INC., Los Altos, CA (US); THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 472 days.

(21) Appl. No.: 17/714,848

(22) Filed: Apr. 6, 2022

(65) Prior Publication Data
US 2023/0326188 A1    Oct. 12, 2023

(51) Int. Cl.
G06V 10/774    (2022.01)
G06V 10/764    (2022.01)
G06V 10/82    (2022.01)
G06V 20/56    (2022.01)

(52) U.S. Cl.
CPC ........ *G06V 10/7753* (2022.01); *G06V 10/764* (2022.01); *G06V 10/82* (2022.01); *G06V 20/56* (2022.01)

(58) Field of Classification Search
CPC .. G06V 10/7753; G06V 10/764; G06V 10/82; G06V 20/56; G06V 10/762; G06V 10/84
USPC .......................................................... 382/157
See application file for complete search history.

(56) References Cited

U.S. PATENT DOCUMENTS

| | | | |
|---|---|---|---|
| 8,185,481 B2 | 5/2012 | Long et al. | |
| 2019/0205667 A1* | 7/2019 | Avidan | G06F 18/28 |
| 2020/0159231 A1* | 5/2020 | Codevilla | G05D 1/0221 |
| 2020/0304729 A1 | 9/2020 | Runia et al. | |
| 2020/0334495 A1 | 10/2020 | Al-Rfou et al. | |

(Continued)

OTHER PUBLICATIONS

Graph Contrastive Learning with Augmentations, Yuning You, Tianlong Chen, Yongduo Sui, Ting Chen, Zhangyang Wang, Yang Shen, 34th Conference on Neural Information Processing Systems (NeurIPS 2020), Vancouver, Canada. (Year: 2020).*

(Continued)

*Primary Examiner* — Nay A Maung
*Assistant Examiner* — Heath E. Wells
(74) *Attorney, Agent, or Firm* — SEYFARTH SHAW LLP

(57) ABSTRACT

A method for self-supervised learning is described. The method includes generating a plurality of augmented data from unlabeled image data. The method also includes generating a population augmentation graph for a class determined from the plurality of augmented data. The method further includes minimizing a contrastive loss based on a spectral decomposition of the population augmentation graph to learn representations of the unlabeled image data. The method also includes classifying the learned representations of the unlabeled image data to recover ground-truth labels of the unlabeled image data.

17 Claims, 9 Drawing Sheets

(56) References Cited

U.S. PATENT DOCUMENTS

| | | | |
|---|---|---|---|
| 2021/0055737 A1* | 2/2021 | Saleem | G06V 10/82 |
| 2021/0089762 A1* | 3/2021 | Rahimi | G06V 40/10 |
| 2021/0197720 A1* | 7/2021 | Houston | G06N 3/045 |
| 2021/0271866 A1* | 9/2021 | Hayakawa | G06V 20/41 |
| 2021/0326660 A1* | 10/2021 | Krishnan | G06F 18/214 |
| 2021/0387584 A1* | 12/2021 | Daniels | G06V 20/58 |
| 2022/0111860 A1* | 4/2022 | Brahma | G06V 10/764 |
| 2022/0335258 A1* | 10/2022 | Raventos | G06N 3/084 |
| 2022/0374658 A1* | 11/2022 | Chen | G06N 3/045 |
| 2023/0145919 A1* | 5/2023 | Ozay | G06N 20/00 706/12 |
| 2025/0086462 A1* | 3/2025 | Chen | G06V 10/7753 |

OTHER PUBLICATIONS

SELFGNN: Self-supervised Graph Neural Networks without explicit negative sampling, Zekarias T. Kefato, Sarunas Girdzijauskas Association for Computing Machinery, ACM ISBN 978-1-4503-XXXX-X/18/06, May 20, 2021 (Year: 2021).*

Provable Guarantees for Self-Supervised Deep Learning with Spectral Contrastive Loss, Ma, Tengyu, Gaidon, Adrien David, Wei, Colin, Haochen, Jeff Z., arXiv:2106.04156v1 [cs.LG] Jun. 8, 2021 (Year: 2021).*

Zhong, et al., "Graph Contrastive Clustering", arXiv:2104.01429v1, Apr. 3, 2021.

Tsai, et al., "Self-supervised Learning From A Multi-View Perspective," arXiv.2006.05576v4, Mar. 22, 2021.

You, et al., "Graph Contrastive Learning with Augmentations," 34th Conference on Neural Information Processing Systems (NeurIPS 2020); Vancouver, Canada, 2020.

Arora, et al. "A Theoretical Analysis of Contrastive Unsupervised Representation Learning", arXiv.1902.09229v1, Feb. 25, 2019.

Jin, et al., "Multi-scale contrastive siamese Networks for Self-Supervised Graph Representation Learning", Proceedings of the Thirtieth International Joint Conference on Artificial Intelligence (pp. 1477-1483), Association for the Advancement of Artificial Intelligence (AAAI), 2021.

Kefato, et al. "SelfGNN Self-supervised Graph Neural Networks without explicit negative sampling", arXiv:2103.14958v4, May 20, 2022.

Lin, et al. "Prototypical Graph Contrastive Learning", arXiv:2106.09645v1, Jun. 17, 2021.

Suresh, et al. "Adversarial Graph Augmentation to Improve Graph Contrastive Learning", 35th Conference on Neural Information Processing Systems (NeurIPS 2021), 2021.

Wei, et al. "Theoretical Analysis of Self-Training With Deep Network on Unlabeled Data", International Conference on Learning Representations (ICLR 2021), May 2021.

* cited by examiner

PROVABLE GUARANTEES FOR SELF-SUPERVISED DEEP LEARNING WITH SPECTRAL CONTRASTIVE LOSS

BACKGROUND

Field

Certain aspects of the present disclosure generally relate to autonomous vehicle technology and, more particularly, to provable guarantees for self-supervised deep learning with spectral contrastive loss.

Background

Human drivers navigate busy roads by carefully observing, anticipating, and reacting to the potential actions of other pedestrians and/or vehicles. Similarly, autonomous vehicles (AVs) use learned perceptual and predictive components for detecting and forecasting surrounding road users, to plan safe motions. In particular, safe operation involves learned components that are well trained. For example, the learned components may be trained using self-supervised learning. Recent empirical breakthroughs have demonstrated the effectiveness of self-supervised learning, which trains representations on unlabeled data with surrogate losses and self-defined supervision signals.

Despite the empirical successes, there is a limited theoretical understanding of why self-supervised losses learn representations that can be adapted to downstream tasks, for example, using linear heads. Conventional self-supervised learning operates under the assumption that two views of an object are somewhat independently conditioned on a label. Nevertheless, the pair of augmented examples used in practical algorithms usually exhibit a strong correlation, even conditioned on the label. For instance, two augmentations of the same dog image share much more similarity than augmentations of two different random dog images. Thus, the existing theory does not explain the practical success of self-supervised learning. A provable guarantee for self-supervised deep learning with spectral contrastive loss is desired.

SUMMARY

A method for self-supervised learning is described. The method includes generating a plurality of augmented data from unlabeled image data. The method also includes generating a population augmentation graph for a class determined from the plurality of augmented data. The method further includes minimizing a contrastive loss based on a spectral decomposition of the population augmentation graph to learn representations of the unlabeled image data. The method also includes classifying the learned representations of the unlabeled image data to recover ground-truth labels of the unlabeled image data.

A non-transitory computer-readable medium having program code recorded thereon for self-supervised learning is described. The non-transitory computer-readable medium includes program code to generate a plurality of augmented data from unlabeled image data. The non-transitory computer-readable medium also includes program code to generate a population augmentation graph for a class determined from the plurality of augmented data. The non-transitory computer-readable medium further includes program code to minimize a contrastive loss based on a spectral decomposition of the population augmentation graph to learn representations of the unlabeled image data. The non-transitory computer-readable medium also includes program code to classify the learned representations of the unlabeled image data to recover ground-truth labels of the unlabeled image data.

A system for self-supervised learning is described. The system includes a data augmentation module to generate a plurality of augmented data from unlabeled image data. The system also includes a population augmentation graph module to generate a population augmentation graph for a class determined from the plurality of augmented data. The system further includes a contrastive loss model to minimize a contrastive loss based on a spectral decomposition of the population augmentation graph to learn representations of the unlabeled image data. The system also includes a ground-truth label recovery module to classify the learned representations of the unlabeled image data to recover ground-truth labels of the unlabeled image data.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
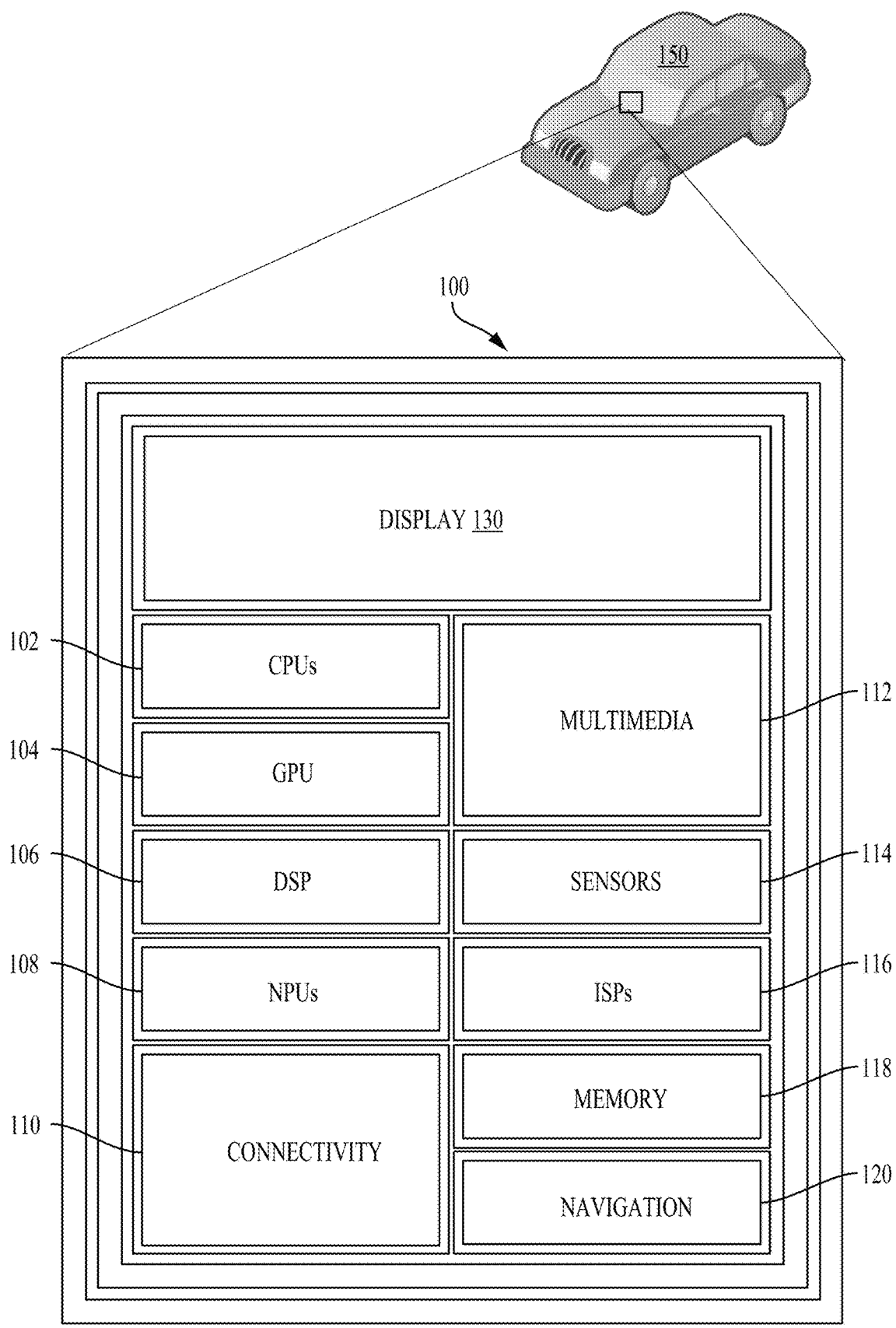
FIG. 1 illustrates an example implementation of designing a neural network using a system-on-a-chip (SOC) for self-supervised deep learning with spectral contrastive loss in a vehicle action planner, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Human drivers navigate busy roads by carefully observing, anticipating, and reacting to the potential actions of other pedestrians and/or vehicles. Similarly, autonomous vehicles (AVs) use learned perceptual and predictive components for detecting and forecasting surrounding road users to plan safe motions. In particular, safe operation involves learned components that are well trained. For example, the learned components may be trained using self-supervised learning. Recent empirical breakthroughs have demonstrated the effectiveness of self-supervised learning, which trains representations on unlabeled data using surrogate losses and self-defined supervision signals.

Self-supervision signals in computer vision for training representations on unlabeled data may be defined by using data augmentation to produce multiple views of the same image. For example, contrastive learning objectives encourage closer representations for augmentations (e.g., views) of the same natural data than for randomly sampled pairs of data. Despite the empirical successes, there is a limited theoretical understanding of why self-supervised losses learn representations that can be adapted to downstream tasks, for example, using linear heads. Recent mathematical analysis provides guarantees under the assumption that two views are somewhat independent, conditioned on a label. Nevertheless, the pair of augmented examples used in practical algorithms usually exhibit a strong correlation, even conditioned on the label. For instance, two augmentations of the same dog image share much more similarity than augmentations of two different random dog images. Thus, the existing theory does not explain the practical success of self-supervised learning.

A contrastive learning paradigm may be applied to self-supervised deep learning. Contrastive learning may learn representations by pushing positive pairs (e.g., similar examples from the same class) closer together, while keeping negative pairs far apart. Despite the empirical successes of the contrastive learning paradigm, theoretical foundations are limited. In particular, prior analysis assumes conditional independence of the positive pairs given the same class label, but recent empirical applications use heavily correlated positive pairs (e.g., data augmentations of the same image).

Aspects of the present disclosure are directed to applications of contrastive learning without assuming conditional independence of positive pairs using the novel concept of an augmentation graph on data. In some aspects of the present disclosure, edges of the augmentation graph connect augmentations of the same data, and ground-truth classes naturally form connected sub-graphs. Some aspects of the present disclosure propose a loss that performs spectral decomposition on a population augmentation graph, which may be succinctly written as a contrastive learning objective using neural network representations. Minimizing this objective leads to features with provable accuracy guarantees under linear probe evaluation. These accuracy guarantees also hold when minimizing the training contrastive loss by standard generalization bounds. In all, these aspects of the present disclosure provide a provable analysis for contrastive learning where the guarantees can apply to realistic empirical settings.

Aspects of the present disclosure are directed to a theoretical framework for self-supervised learning without specifying conditional independence. Some aspects of the present disclosure design a principled, practical loss function for learning neural network representations that resemble state-of-the-art contrastive learning methods. These aspects of the present disclosure illustrate that linear classification using representations learned on a polynomial number of unlabeled data samples can recover the ground-truth labels of the data with high accuracy. This capability is based on a simple and realistic data assumption.

Some aspects of the present disclosure involve a fundamental data property that leverages a notion of continuity of the population data within the same class. Though a random pair of examples from the same class can be far apart, the pair is often connected by (many) sequences of examples, where consecutive examples in the sequences are close neighbors within the same class. This property is more salient when the neighborhood of an example includes many different types of augmentations. Aspects of the present disclosure empirically demonstrate this type of connectivity property and application of the connectivity property in pseudo-labeling algorithms.

FIG. 1 illustrates an example implementation of self-supervised deep learning with spectral contrastive loss for a vehicle action planner using a system-on-a-chip (SOC) 100 of an autonomous vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fifth generation (5G) cellular network technology, fourth generation long term evolution (4G LTE) connectivity, unlicensed WiFi connectivity, USB connectivity, Bluetooth® connectivity, and the like. In addition, a multimedia processor 112 in combination with a display 130 may, for example, apply a temporal component of a current traffic state to select a vehicle behavior control action, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the autonomous vehicle 150. In this arrangement, the autonomous vehicle 150 may include a processor and other features of the SOC 100. In this aspect of the present disclosure, instructions loaded into a processor (e.g., CPU 102) or the NPU 108 of the autonomous vehicle 150 may include program code to determine one or more merge gaps between vehicles in a target lane of a multilane highway based on images processed by the sensor processor 114. The instructions loaded into a processor (e.g., CPU 102) may also include program code executed by the processor to provide self-supervised deep learning with spectral contrastive loss for a vehicle action planner model.

In aspects of the present disclosure, the instructions include program code to generate a plurality of augmented data from unlabeled image data. The instructions also include program code to generate a population augmentation graph for a class determined from the plurality of augmented data. The instructions also include program code to minimize a contrastive loss based on a spectral decomposition of the population augmentation graph to learn representations of the unlabeled image data. The instructions also include program code to classify the learned representations of the unlabeled image data to recover ground-truth labels of the unlabeled image data. These aspects of the present disclosure are directed to applications of contrastive learning without assuming conditional independence of positive pairs using the novel concept of an augmentation graph on data.

Figure 2:
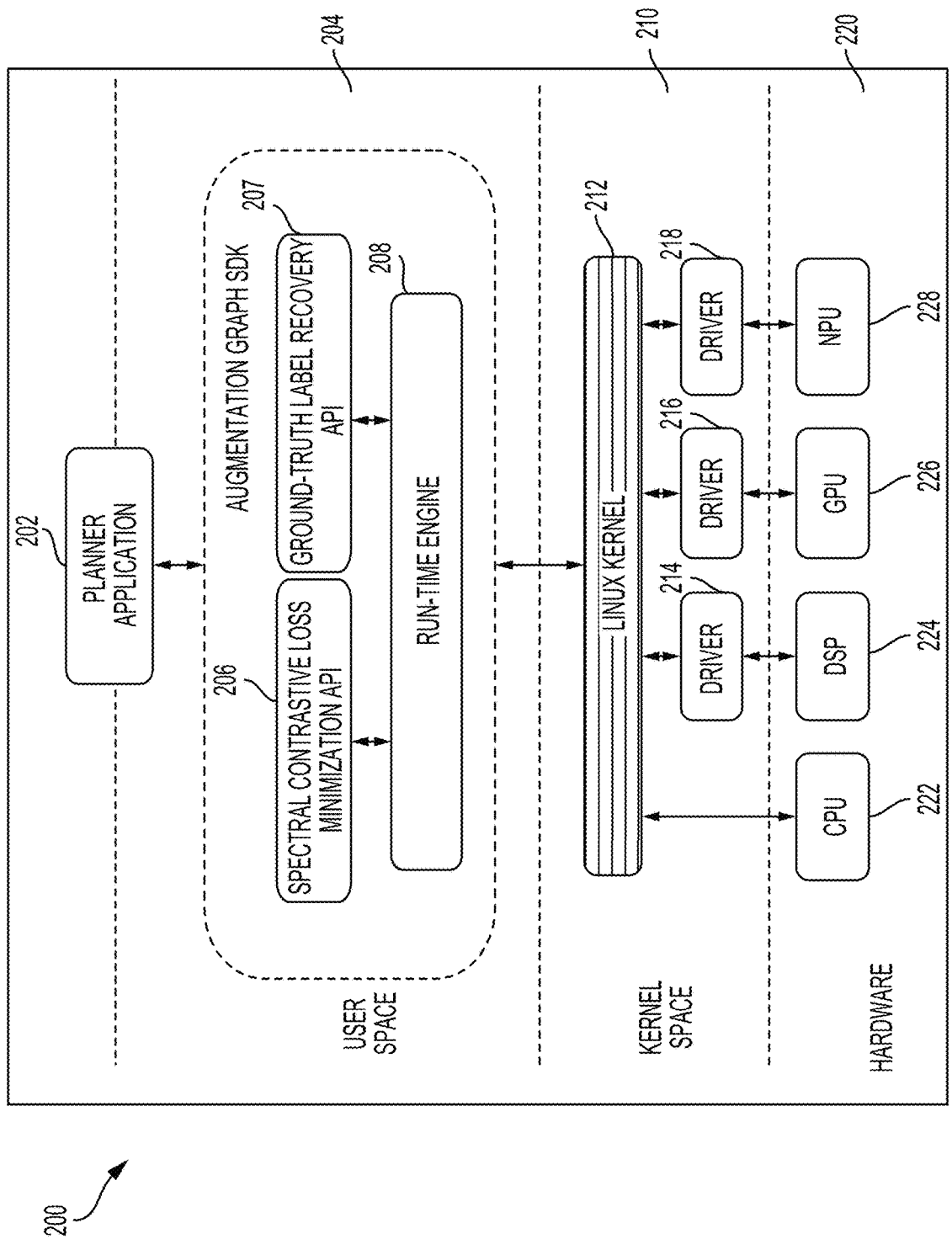
FIG. 2 is a block diagram illustrating a software architecture that may modularize artificial intelligence (AI) functions for self-supervised deep learning with spectral contrastive loss in a vehicle action planner of an autonomous agent, according to aspects of the present disclosure.

FIG. 2 is a block diagram illustrating a software architecture 200 that may modularize artificial intelligence (AI) functions for self-supervised deep learning with spectral contrastive loss in a vehicle action planner, according to aspects of the present disclosure. Using the architecture, a planner application 202 may be designed such that it may cause various processing blocks of a system-on-a-chip (SOC) 220 (for example a CPU 222, a DSP 224, a GPU 226, and/or an NPU 228) to perform supporting computations during run-time operation of the planner application 202. While FIG. 2 describes the software architecture 200 to provide self-supervised deep learning with spectral contrastive loss for a vehicle action planner of an autonomous agent, it should be recognized that the self-supervised deep learning functionality is not limited to autonomous agents. According to aspects of the present disclosure, the self-supervised deep learning functionality is applicable to any machine learning function.

The planner application 202 may be configured to call functions defined in a user space 204 that may, for example, provide vehicle action planning services (e.g., throttling, steering, and braking). The planner application 202 may request to compile program code associated with a library defined in a spectral contrastive loss minimization application programming interface (API) 206. In these aspects of the present disclosure, the spectral contrastive loss minimization API 206 minimizes a contrastive loss based on a spectral decomposition of a population augmentation graph to learn representations of unlabeled image data. The spectral contrastive loss minimization API 206 relies on a population augmentation graph generated for a class determined from a set of augmented data.

The planner application 202 may request to compile program code associated with a library defined in a ground-truth label recovery API 207. In these aspects of the present disclosure, the ground-truth label recovery API 207 classifies the learned representations of the unlabeled image data to recover ground-truth labels of the unlabeled image data. These aspects of the present disclosure are directed to applications of contrastive learning without assuming conditional independence of positive pairs using the novel concept of an augmentation graph on data. Once trained based on the recovered ground-truth labels, the planner application 202 selects a vehicle control action of the ego vehicle in response to detected agents within a traffic environment of the ego vehicle.

A run-time engine 208, which may be compiled code of a runtime framework, may be further accessible to the planner application 202. The planner application 202 may cause the run-time engine 208, for example, to take actions for controlling the autonomous agent. When an ego vehicle enters a traffic environment, the run-time engine 208 may in turn send a signal to an operating system 210, such as a Linux Kernel 212, running on the SOC 220. FIG. 2 illustrates the Linux Kernel 212 as software architecture for implementing trajectory planning of an autonomous agent using self-supervised deep learning. It should be recognized, however, that aspects of the present disclosure are not limited to this exemplary software architecture. For example, other kernels may be used to provide the software architecture to support self-supervised deep learning functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
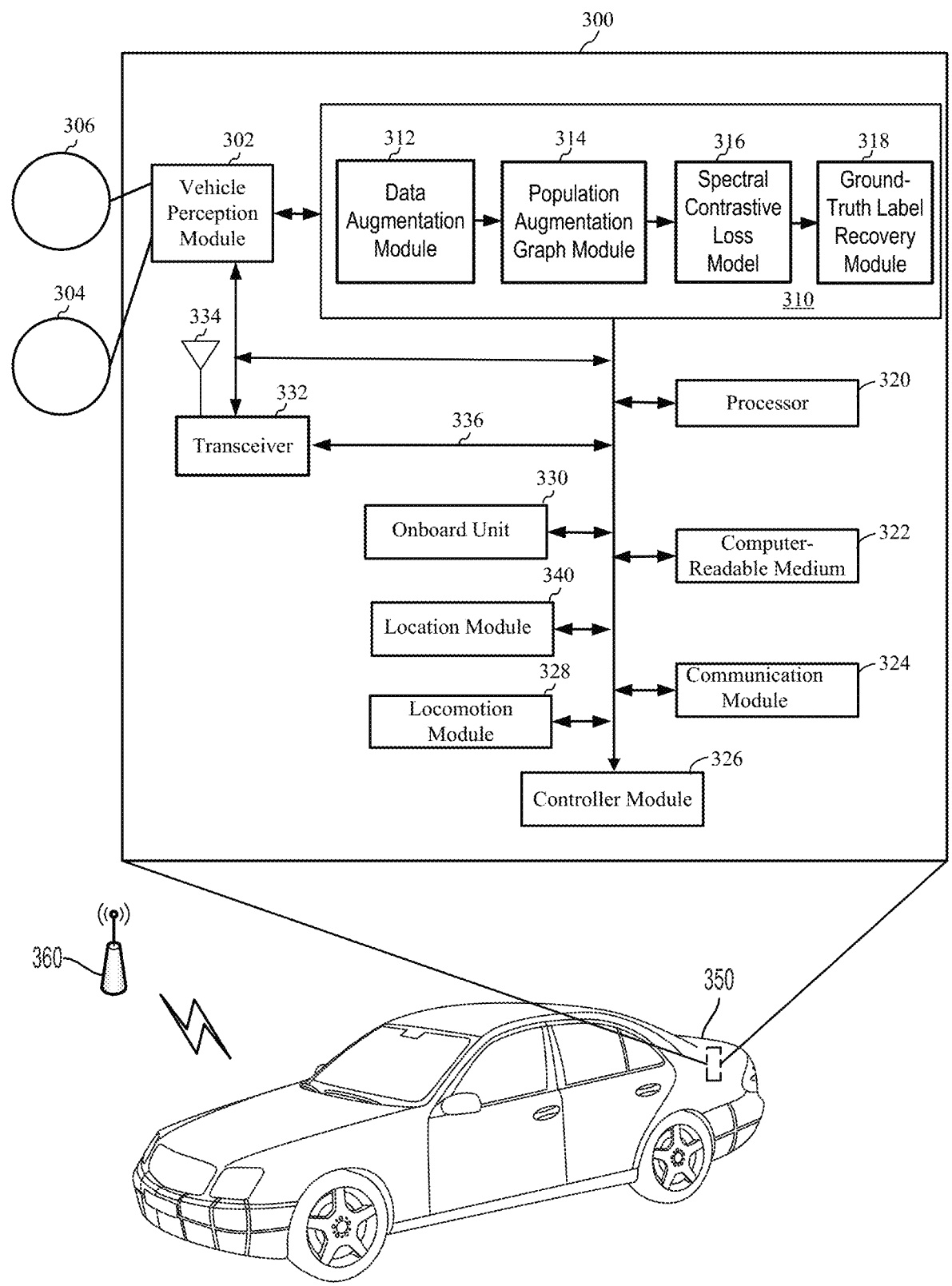
FIG. 3 is a diagram illustrating a vehicle action planner system configured using self-supervised deep learning with spectral contrastive loss for training a vehicle action planner, according to aspects of the present disclosure.

FIG. 3 is a diagram illustrating an example of a hardware implementation for a vehicle action planner system 300, according to aspects of the present disclosure. The vehicle action planner system 300 may be configured using self-supervised deep learning with spectral contrastive loss for training a vehicle action planner of an ego vehicle. The vehicle action planner system 300 may be a component of a vehicle, a robotic device, or other autonomous device (e.g., autonomous vehicles, ride-share cars, etc.). For example, as shown in FIG. 3, the vehicle action planner system 300 is a component of an autonomous vehicle 350.

Aspects of the present disclosure are not limited to the vehicle action planner system 300 being a component of the autonomous vehicle 350. Other devices, such as a bus, motorcycle, or other like autonomous vehicle, are also contemplated for implementing the vehicle action planner system 300 implemented using self-supervised deep learning with spectral contrastive loss. In this example, the autonomous vehicle 350 may be semi-autonomous; however, other configurations for the autonomous vehicle 350 are contemplated, such as an advanced driver assistance system (ADAS).

The vehicle action planner system 300 may be implemented with an interconnected architecture, represented generally by an interconnect 336. The interconnect 336 may include any number of point-to-point interconnects, buses, and/or bridges depending on the specific application of the vehicle action planner system 300 and the overall design constraints. The interconnect 336 links together various circuits including one or more processors and/or hardware modules, represented by a vehicle perception module 302, a vehicle action planner 310, a processor 320, a computer-readable medium 322, a communication module 324, a controller module 326, a locomotion module 328, an onboard unit 330, and a location module 340. The interconnect 336 may also link various other circuits such as timing sources, peripherals, voltage regulators, and power management circuits, which are well known in the art, and therefore, will not be described any further.

The vehicle action planner system 300 includes a transceiver 332 coupled to the vehicle perception module 302, the vehicle action planner 310, the processor 320, the computer-readable medium 322, the communication module 324, the controller module 326, the locomotion module 328, the location module 340, and the onboard unit 330. The transceiver 332 is coupled to antenna 334. The transceiver 332 communicates with various other devices over a transmission medium. For example, the transceiver 332 may receive commands via transmissions from a user or a connected vehicle. In this example, the transceiver 332 may receive/transmit vehicle-to-vehicle traffic state information for the vehicle action planner 310 to/from connected vehicles within the vicinity of the autonomous vehicle 350.

The vehicle action planner system 300 includes the processor 320 coupled to the computer-readable medium 322. The processor 320 performs processing, including the execution of software stored on the computer-readable medium 322 to provide vehicle action planning functionality, according to the present disclosure. The software, when executed by the processor 320, causes the vehicle action planner system 300 to perform the various functions described for vehicle behavior planning (e.g., vehicle action selection) of the autonomous vehicle 350, or any of the modules (e.g., 302, 310, 324, 326, 328, 330, and/or 340). The computer-readable medium 322 may also be used for storing data that is manipulated by the processor 320 when executing the software.

The vehicle perception module 302 may obtain measurements via different sensors, such as a first sensor 306 and a second sensor 304. The first sensor 306 may be a vision sensor (e.g., a stereoscopic camera or a red-green-blue (RGB) camera) for capturing 2D images. The second sensor 304 may be a ranging sensor, such as a light detection and ranging (LiDAR) sensor or a radio detection and ranging (RADAR) sensor. Of course, aspects of the present disclosure are not limited to the aforementioned sensors as other types of sensors (e.g., thermal, sonar, and/or lasers) are also contemplated for either of the first sensor 306 or the second sensor 304.

The measurements of the first sensor 306 and the second sensor 304 may be processed by the processor 320, the vehicle perception module 302, the vehicle action planner 310, the communication module 324, the controller module 326, the locomotion module 328, the onboard unit 330, and/or the location module 340. In conjunction with the computer-readable medium 322, the measurements of the first sensor 306 and the second sensor 304 are processed to implement the functionality described herein. In one configuration, the data captured by the first sensor 306 and the second sensor 304 may be transmitted to a connected vehicle via the transceiver 332. The first sensor 306 and the second sensor 304 may be coupled to the autonomous vehicle 350 or may be in communication with the autonomous vehicle 350.

The location module 340 may determine a location of the autonomous vehicle 350. For example, the location module 340 may use a global positioning system (GPS) to determine the location of the autonomous vehicle 350. The location module 340 may implement a dedicated short-range communication (DSRC)-compliant GPS unit. A DSRC-compliant GPS unit includes hardware and software to make the autonomous vehicle 350 and/or the location module 340 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

The communication module 324 may facilitate communications via the transceiver 332. For example, the communication module 324 may be configured to provide communication capabilities via different wireless protocols, such as 5G, WiFi, long term evolution (LTE), 4G, 3G, etc. The communication module 324 may also communicate with other components of the autonomous vehicle 350 that are not modules of the vehicle action planner system 300. The transceiver 332 may be a communications channel through a network access point 360. The communications channel may include DSRC, LTE, LTE-D2D, mmWave, WiFi (infrastructure mode), WiFi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communications, mmWave, WiFi (infrastructure mode), WiFi (ad-hoc mode), visible light communication, TV white space communication, and satellite communication. The network access point 360 may also include a mobile data network that may include 3G, 4G, 5G, LTE, LTE-V2X, LTE-D2D, VoLTE, or any other mobile data network or combination of mobile data networks. Further, the network access point 360 may include one or more IEEE 802.11 wireless networks.

The vehicle action planner system 300 also includes the controller module 326 for planning a route and controlling the locomotion of the autonomous vehicle 350, via the locomotion module 328 for autonomous operation of the autonomous vehicle 350. In one configuration, the controller module 326 may override a user input when the user input is expected (e.g., predicted) to cause a collision according to an autonomous level of the autonomous vehicle 350. The modules may be software modules running in the processor 320, resident/stored in the computer-readable medium 322, and/or hardware modules coupled to the processor 320, or some combination thereof.

The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control ("ACC"); parking assistance with automated steering; and lane keeping assistance ("LKA") type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle ("HAV") is an autonomous vehicle that is Level 3 or higher. Accordingly, in some configurations the autonomous vehicle 350 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The vehicle action planner 310 may be in communication with the vehicle perception module 302, the processor 320, the computer-readable medium 322, the communication module 324, the controller module 326, the locomotion module 328, the location module 340, the onboard unit 330, and the transceiver 332. In one configuration, the vehicle action planner 310 receives sensor data from the vehicle perception module 302. The vehicle perception module 302 may receive the sensor data from the first sensor 306 and the second sensor 304. According to aspects of the disclosure, the vehicle perception module 302 may filter the data to remove noise, encode the data, decode the data, merge the data, extract frames, or perform other vehicle perception functions. In an alternate configuration, the vehicle action planner 310 may receive sensor data directly from the first sensor 306 and the second sensor 304 to determine, for example, input traffic data images.

Human drivers navigate busy roads by carefully observing, anticipating, and reacting to the potential actions of other pedestrians and/or vehicles. Similarly, autonomous vehicles (AVs) use learned perceptual and predictive components for detecting and forecasting surrounding road users to plan safe motions. In particular, safe operation of the autonomous vehicle 350 involves learned components that are well trained. For example, the learned components may be trained using self-supervised learning. Recent empirical breakthroughs have demonstrated the effectiveness of self-supervised learning, which trains representations on unlabeled data using surrogate losses and self-defined supervision signals.

Self-supervision signals in computer vision for training representations on unlabeled data may be defined by using data augmentation to produce multiple views of the same image. For example, contrastive learning objectives encourage closer representations for augmentations (e.g., views) of the same natural data than for randomly sampled pairs of data. Despite the empirical successes, there is a limited theoretical understanding of why self-supervised losses learn representations that can be adapted to downstream tasks, for example, using linear heads. Recent mathematical analysis provides guarantees under the assumption that two views are somewhat independent, conditioned on a label.

Nevertheless, the pair of augmented examples used in practical algorithms usually exhibit a strong correlation, even conditioned on the label. For instance, two augmentations of the same dog image share much more similarity than augmentations of two different random dog images. Thus, the existing theory does not explain the practical success of self-supervised learning.

As indicated above, a contrastive learning paradigm may be applied to self-supervised deep learning. Contrastive learning may learn representations by pushing positive pairs (e.g., similar examples from the same class) closer together, while keeping negative pairs far apart. Despite the empirical successes of the contrastive learning paradigm, theoretical foundations are limited. In particular, prior analysis assumes conditional independence of the positive pairs given the same class label, but recent empirical applications use heavily correlated positive pairs (e.g., data augmentations of the same image). These aspects of the present disclosure train a predictive model of the autonomous vehicle 350 from a training set using recovered ground-truth labels.

Aspects of the present disclosure are directed to applications of contrastive learning without assuming conditional independence of positive pairs using the novel concept of a population augmentation graph from unlabeled data. In some aspects of the present disclosure, edges of the augmentation graph connect augmentations of the same data, and ground-truth classes naturally form connected sub-graphs. Some aspects of the present disclosure propose a loss that performs spectral decomposition on a population augmentation graph, which may be succinctly written as a contrastive learning objective using neural network representations. Minimizing this objective leads to features with provable accuracy guarantees under linear probe evaluation. These accuracy guarantees also hold when minimizing the training contrastive loss by standard generalization bounds. In all, these aspects of the present disclosure provide a provable analysis for contrastive learning where the guarantees can apply to realistic empirical settings.

As shown in FIG. 3, the vehicle action planner 310 of the autonomous vehicle 350 includes a data augmentation module 312, a population augmentation graph module 314, a spectral contrastive loss model 316, and a ground-truth label recovery module 318. The data augmentation module 312, the population augmentation graph module 314, the spectral contrastive loss model 316, and the ground-truth label recovery module 318 may be components of a same or different artificial neural network, such as a deep convolutional neural network (CNN). The vehicle action planner 310 is not limited to a CNN. The vehicle action planner 310 receives a data stream from the vehicle perception module 302, captured using the first sensor 306 and/or the second sensor 304. The data stream may include a 2D RGB image from the first sensor 306 and LIDAR data points from the second sensor 304. The data stream may include multiple frames, such as image frames of traffic data processed by the vehicle perception module 302.

The data augmentation module 312 may be configured to generate a set of augmented data from unlabeled image data, for example, captured by the vehicle perception module 302. For example, the data augmentation module 312 may process a polynomial number of unlabeled data samples. The population augmentation graph module 314 is configured to generate a population augmentation graph for a class determined from the plurality of augmented data. In some aspects of the present disclosure, the population augmentation graph module 314 relies on a fundamental data property that is a notion of continuity of the population data within the same class. Though a random pair of examples from the same class can be far apart, the pair is often connected by (many) sequences of examples, where consecutive examples in the sequences are close neighbors within the same class. This property is more salient when the neighborhood of an example includes many different types of augmentations.

For example, the spectral contrastive loss model 316 is configured to minimize a contrastive loss based on a spectral decomposition of the population augmentation graph to learn representations of the unlabeled image data. Some aspects of the present disclosure describe a particular formulation of a loss value for contrastive learning. In particular, some aspects of the present disclosure discuss a contrastive learning paradigm, which learns representations by pushing positive pairs (or similar examples from the same class) closer together, while keeping negative pairs far apart. These aspects of the present disclosure analyze contrastive learning without assuming conditional independence of the positive pairs using the novel concept of an augmentation graph on data. For example, edges in this augmentation graph connect augmentations of the same data, and ground-truth classes naturally form connected sub-graphs of the augmentation graph.

In some aspects of the present disclosure, the ground-truth label recovery module 318 is configured to classify the learned representations of the unlabeled image data from the spectral contrastive loss model 316 to recover ground-truth labels of the unlabeled image data. Under a simple and realistic data assumption, the ground-truth label recovery module 318 may apply linear classification using representations learned on a polynomial number of unlabeled data samples to recover the ground-truth labels of the data with high accuracy. The ground-truth labels may be used to train the vehicle action planner 310. In particular, a vehicle behavior of the autonomous vehicle 350 may be controlled by the vehicle action planner 310 in a manner for motion planning and maneuvering of the autonomous vehicle 350 to perform a driving maneuver, for example, as shown in FIG. 4.

Figure 4:
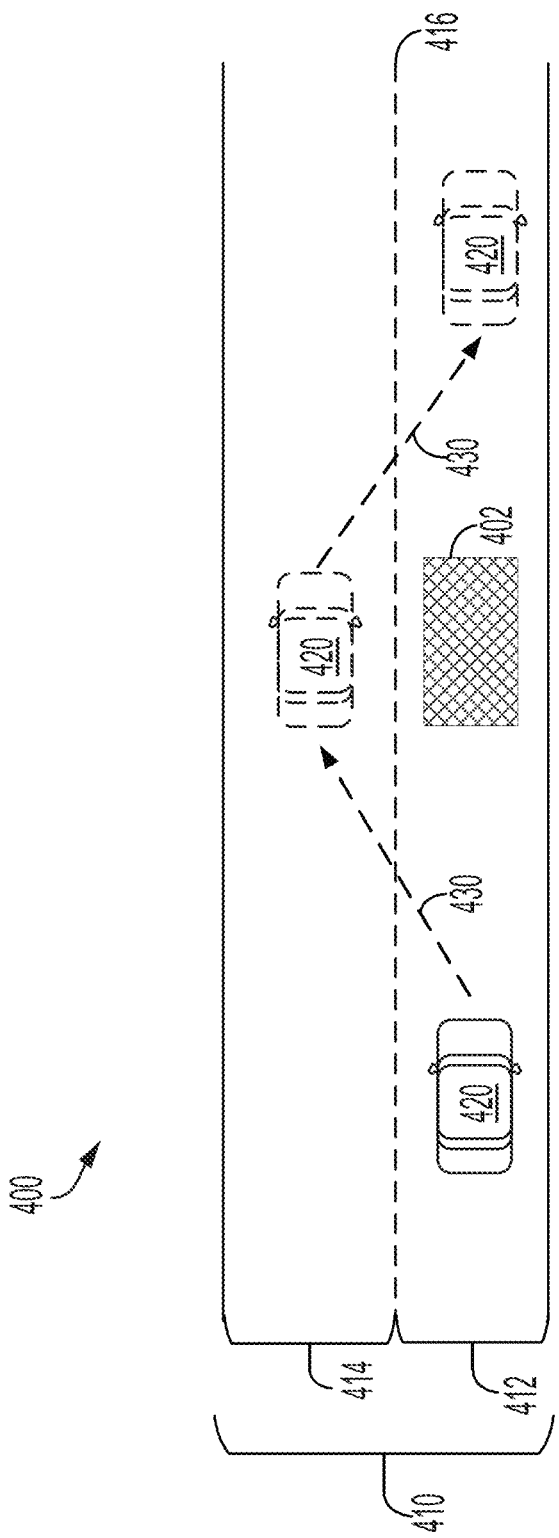
FIG. 4 is a diagram illustrating an overview of a roadway environment, including an ego vehicle having a data driven trajectory planner, according to aspects of the present disclosure.

FIG. 4 is a diagram illustrating an overview of a roadway environment, including an ego vehicle having a data-driven trajectory planner, according to aspects of the present disclosure. In this example, a roadway environment 400 includes a roadway 410, having a first lane 412 in which an ego vehicle 420 is traveling in a second lane 414. In addition, the first lane 412 also includes an obstruction 402. In this example, the ego vehicle 420 is configured to monitor the dynamics of both vehicles/obstructions in the first lane 412, as well as vehicles/obstructions in the second lane 414 of the roadway 410. In this example, the ego vehicle 420, may be the autonomous vehicle 350, shown in FIG. 3.

In one aspect of the present disclosure, maneuvering of the ego vehicle 420 is essentially controlled by a vehicle planner (e.g., the vehicle action planner 310 of FIG. 3). In this example, the ego vehicle 420 (e.g., the vehicle perception module 302 of FIG. 3) identifies the obstruction 402 in the first lane 412 of the roadway 410. That is, the ego vehicle 420 is configured to identify a driving trajectory for avoiding the obstruction 402 in the first lane 412 of the roadway 410. According to aspects of the present disclosure, the ego vehicle 420 is configured to identify a trajectory for a driving maneuver performed by the ego vehicle 420 to avoid the obstruction 402 in the first lane 412. In some aspects of the present disclosure, the ego vehicle 420 is deployed using the spectral contrastive loss model 316 and the ground-truth label recovery module 318 to enable self-supervised learning to train the vehicle action planner 310, as shown in FIG. 3.

Human drivers navigate busy roads, such as the roadway 410 by carefully observing, anticipating, and reacting to the potential actions of other pedestrians and/or vehicles. Similarly, autonomous vehicles (AVs), such as the ego vehicle 420, use learned perceptual and predictive components for detecting and forecasting surrounding road users to plan safe motions. In particular, safe operation involves learned components that are well trained. For example, the learned components may be trained using self-supervised learning. Recent empirical breakthroughs have demonstrated the effectiveness of self-supervised learning, which trains representations on unlabeled data using surrogate losses and self-defined supervision signals.

Self-supervision signals in computer vision for training representations on unlabeled data may be defined by using data augmentation to produce multiple views of the same image. For example, contrastive learning objectives encourage closer representations for augmentations (e.g., views) of the same natural data than for randomly sampled pairs of data. Despite the empirical successes, there is a limited theoretical understanding of why self-supervised losses learn representations that can be adapted to downstream tasks, for example, using linear heads. Recent mathematical analysis provides guarantees under the assumption that two views are somewhat independent, conditioned on a label. Nevertheless, the pair of augmented examples used in practical algorithms usually exhibit a strong correlation, even conditioned on the label. For instance, two augmentations of the same dog image share much more similarity than augmentations of two different random dog images. Thus, the existing theory does not explain the practical success of self-supervised learning.

A contrastive learning paradigm may be applied to self-supervised deep learning. Contrastive learning may learn representations by pushing positive pairs (e.g., similar examples from the same class) closer together, while keeping negative pairs far apart. Despite the empirical successes of the contrastive learning paradigm, theoretical foundations are limited. In particular, prior analysis assumes conditional independence of the positive pairs given the same class label, but recent empirical applications use heavily correlated positive pairs (e.g., data augmentations of the same image).

Aspects of the present disclosure are directed to applications of contrastive learning without assuming conditional independence of positive pairs using the novel concept of an augmentation graph on data. In some aspects of the present disclosure, edges of the augmentation graph connect augmentations of the same data, and ground-truth classes naturally form connected sub-graphs. Some aspects of the present disclosure propose a loss that performs spectral decomposition on a population augmentation graph, which may be succinctly written as a contrastive learning objective using neural net representations. Minimizing this objective leads to features with provable accuracy guarantees under linear probe evaluation. These accuracy guarantees also hold when minimizing the training contrastive loss by standard generalization bounds. In all, these aspects of the present disclosure provide a provable analysis for contrastive learning where the guarantees can apply to realistic empirical settings.

Aspects of the present disclosure are directed to a theoretical framework for self-supervised learning without specifying conditional independence. Some aspects of the present disclosure design a principled, practical loss function for learning neural network representations that resemble state-of-the-art contrastive learning methods. These aspects of the present disclosure illustrate that linear classification using representations learned on a polynomial number of unlabeled data samples can recover the ground-truth labels of the data with high accuracy. This capability is based on a simple and realistic data assumption.

Some aspects of the present disclosure involve a fundamental data property that leverages a notion of continuity of the population data within the same class. Though a random pair of examples from the same class can be far apart, the pair is often connected by (many) sequences of examples, where consecutive examples in the sequences are close neighbors within the same class. This property is more salient when the neighborhood of an example includes many different types of augmentations. Aspects of the present disclosure empirically demonstrate this type of connectivity property and application of the connectivity property in pseudo-labeling algorithms.

Spectral Contrastive Learning on Population Data

The following examples formalize notation regarding a theoretical framework, a spectral contrastive loss, and an analysis of the performance of the representations learned on population data, according to aspects of the present disclosure. The following examples use $\bar{\mathcal{X}}$ to denote the set of all natural data (e.g., raw inputs without augmentation). It is assumed that each $\bar{x} \in \bar{\mathcal{X}}$ belongs to one of r classes, and let $y: \bar{\mathcal{X}} \rightarrow [r]$ denote the ground-truth (e.g., deterministic) labeling function. Let $\mathcal{P}_{\bar{\mathcal{X}}}$ be the population distribution over $\bar{\mathcal{X}}$ from which training data is drawn to test a final performance. For the ease of exposition, $\bar{\mathcal{X}}$ is a finite but exponentially large set (e.g., all real vectors in $\mathbb{R}^d$ with bounded precision). This allows use of sums instead of integrals and avoids non-essential nuances related to calculus.

Some aspects of the present disclosure formulate data augmentations as follows. Given a natural data sample $\bar{x} \in \bar{\mathcal{X}}$, $\mathcal{A}(\cdot|\bar{x})$ denotes the distribution of the corresponding augmentations. For instance, when $\bar{x}$ represents an image, $\mathcal{A}(\cdot|\bar{x})$ can be the distribution of common augmentations that includes Gaussian blur, color distortion, and random cropping. In this example, $\mathcal{X}$ denotes the set of all augmented data, which is the union of supports of all $\mathcal{A}(\cdot|\bar{x})$ for $\bar{x} \in \bar{\mathcal{X}}$. As with $\bar{\mathcal{X}}$, it is assumed that $\mathcal{X}$ is a finite but exponentially large set, and denoted $\mathcal{N} = |\mathcal{X}|$.

Some aspects of the present disclosure learn an embedding function $f: \mathcal{X} \rightarrow \mathbb{R}^k$, and then evaluate a quality of the function $f$ based on the minimum error achieved with a linear probe. Concretely, a linear classifier has weights $B \in \mathbb{R}^{k \times r}$ and predicts $g_{f,B}(x) = \mathrm{argmax}_{i \in [r]} (f(x)^T B)_i$ for an augmented data x (e.g., arg max breaks tie arbitrarily). Then, given a natural data sample $\bar{x}$, ensemble the predictions on augmented data and predict:

$$\bar{g}_{f,B}(\bar{x}) := \underset{i \in [r]}{\mathrm{argmax}} \; \underset{x \sim \mathcal{A}(\cdot|\bar{x})}{Pr} [g_{f,B}(x) = i].$$

A linear probe error is defined as the error of the best possible linear classifier on the representations:

$$\mathcal{E}(f) := \underset{B \in \mathbb{R}^{k \times r}}{\min} \; \underset{\bar{x} \sim \mathcal{P}_{\bar{\mathcal{X}}}}{Pr} \left[ y(\bar{x}) \neq \bar{g}_{f,B}(\bar{x}) \right] \qquad (1)$$

Augmentation Graph and Spectral Decomposition

Aspects of the present disclosure provide an approach based on the concept of a population augmentation graph. For example, in the following description, a population augmentation graph is denoted by $G(\mathcal{X}, w)$, where the vertex set is all augmentation data $\mathcal{X}$ and w denotes the edge weights defined below. For any two augmented data x, $x' \in \mathcal{X}$, the weight $w_{xx'}$ is defined as the marginal probability of generating the pair x and x' from a random natural data $\bar{x} \sim \mathcal{P}_{\bar{\mathcal{X}}}$:

$$w_{xx'} := \mathbb{E}_{\bar{x} \sim \mathcal{P}_{\bar{\mathcal{X}}}} [\mathcal{A}(x|\bar{x}) \mathcal{A}(x'|\bar{x})] \tag{2}$$

Based on Equation (2), the weights sum to 1 because the total probability mass is 1: $\Sigma_{x,x' \in \mathcal{X}} w_{xx'} = 1$. The relative magnitude intuitively captures the closeness between the two augmented data pair x and x' with respect to the augmentation transformation.

For most of the unrelated augmented data pairs x and x', the value of the weight $w_{xx'}$ is significantly smaller than an average value. For example, when x and x' are random croppings of a cat and a dog respectively, $w_{xx'}$ is essentially zero because no natural data can be augmented into both x and x'. On the other hand, when x and x' are very close in $\ell_2$-distance or very close in $\ell_2$-distance up to color distortion, $w_{xx'}$ is nonzero because they may be augmentations of the same image with Gaussian blur and color distortion. In the following example, the augmented data pair x and x' is connected with an edge if $w_{xx'} > 0$, as further illustrated in FIGS. 5A-5C.

Figures 5A, 5B, 5C:
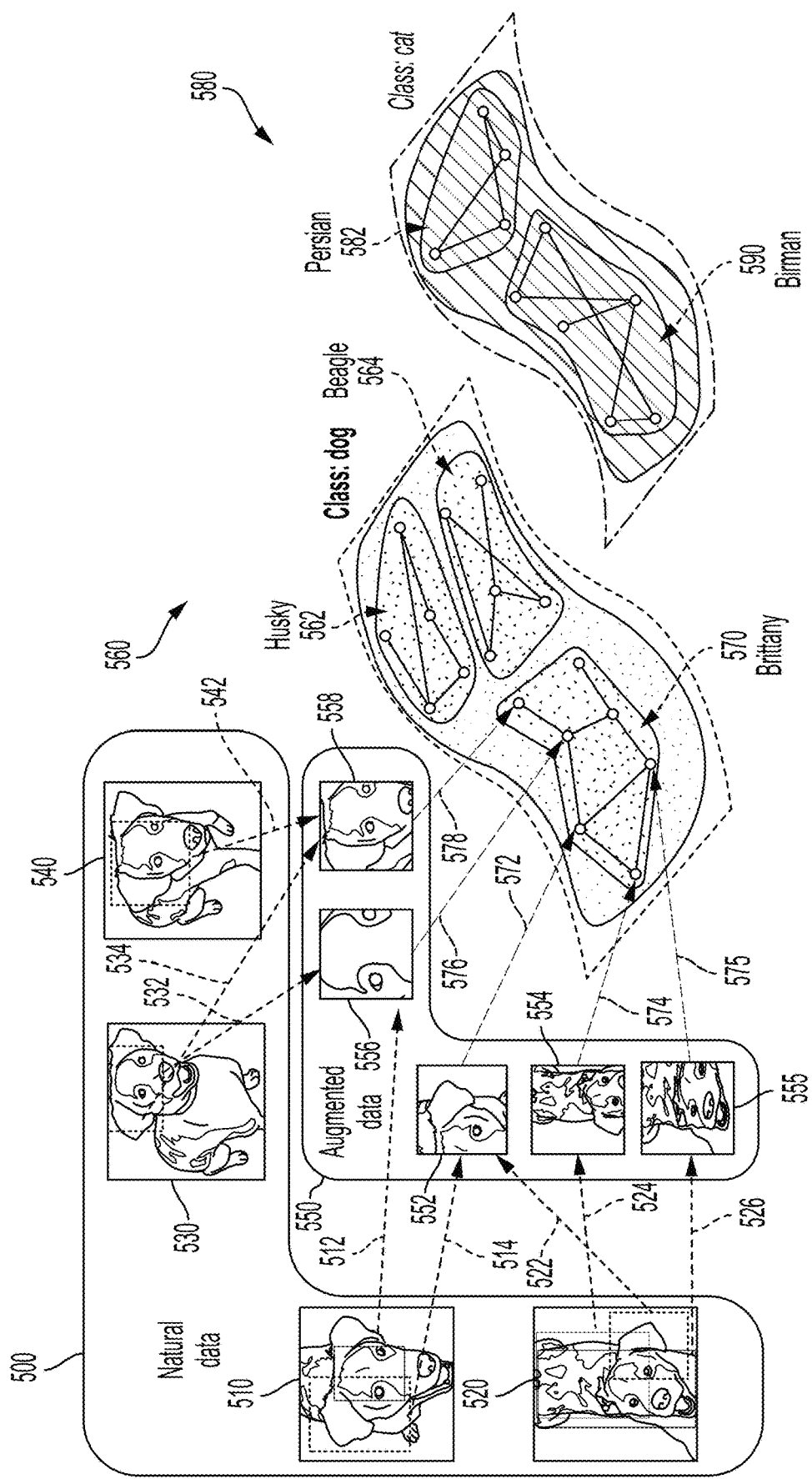
FIGS. 5A-5C are drawings illustrating a process of generating population augmentation graphs, according to aspects of the present disclosure.

FIGS. 5A-5C are drawings illustrating a process of generating a population augmentation graph, according to aspects of the present disclosure. FIG. 5A illustrates natural data 500 of a dog including a first dog image 510, a second dog image 520, a third dog image 530, and a fourth dog image 540. In some aspects of the present disclosure, the natural data 500 is processed to generate an augmented data 550. In this example, the augmented data 550 includes a first augmented data 552, a second augmented data 554, a third augmented data 555, a fourth augmented data 556, and a fifth augmented data 558. The first augmented data 552 represents views of the first dog image 510 and the second dog image 520, as indicated by arrows 514 and 522. The second augmented data 554 represents a view of the second dog image 520, as indicated by an arrow 524. In addition, the third augmented data 555 represents a view of the second dog image 520, as indicated by arrow 526. In addition, fourth augmented data 556 represents views of the first dog image 510 and the third dog image 530, as indicated by arrows 512 and 532. Similarly, the fifth augmented data 558 represents views of the third dog image 530 and the fourth dog image 540, as indicated by arrows 534 and 542.

FIG. 5B illustrates population augmentation graphs according to the augmented data of FIG. 5A, according to aspects of the present disclosure. In this example, the augmentation graphs 560 include a Husky augmentation graph 562, a Beagle augmentation graph 564, and a Brittany augmentation graph 570 for a dog class. According to some aspects of the present disclosure, two of the augmented data 550 are connected in one of the population augmentation graphs if they are views of the same natural data-point. For example, the first augmented data 552 and the second augmented data 554 are connected in the Brittany augmentation graph 570, as noted by arrows 572 and 574. In addition, the second augmented data 554 and the third augmented data 555 are connected in the Brittany augmentation graph 570, as noted by arrows 574 and 575. Similarly, the first augmented data 552 and the third augmented data 555 are connected in the Brittany augmentation graph 570, as noted by arrows 572 and 576. In addition, the third augmented data 555 and the fourth augmented data 556 are connected in the Brittany augmentation graph 570, as noted by arrows 576 and 578.

FIG. 5C illustrates population augmentation graphs for a different class of data relative to the augmented data of FIG. 5A, according to aspects of the present disclosure. In this example, the augmentation graphs 580 include a Persian augmentation graph 582 and a Birman augmentation graph 590 for a cat class. According to some aspects of the present disclosure, augmentations of data from different classes in the downstream tasks are assumed to be nearly disconnected, whereas there are more connections within the same class, shown in FIGS. 5B and 5C. In some aspects of the present disclosure, the existence of disconnected sub-graphs within a class corresponding to potential sub-classes are allowed.

As shown in FIGS. 5A-5C, the population augmentation graphs are defined as having vertices for the augmented data 550 in the population distribution, which can be an exponentially large or infinite set. As shown in FIG. 5B, two vertices are connected with an edge if they are augmentations of the same natural example, such as the first augmented data 552 and the second augmented data 554. Some aspects of the present disclosure rely on a main assumption that for some proper $m \in \mathcal{Z}^+$, the sparsest m-partition (e.g., Definition 3.4) is large. This intuitively states that the augmentation graph is not split into too many disconnected sub-graphs by removing a sparse set of edges. This assumption can be seen as a graph-theoretic version of the continuity assumption on population data. Some aspects of the present disclosure assume that there are very few edges across different ground-truth classes (e.g., Assumption 3.5). FIGS. 5A-5C illustrate a realistic scenario in which edges between the dog and cat ground-truth categories are rare. In these examples, each breed of dogs and cats forms a sub-graph that has sufficient inner connectivity, which cannot be further partitioned.

This assumption that very few edges exist across different ground-truth classes does not involve conditional independence and allows disconnected sub-graphs within a class. In addition, the classes in the downstream task are flexible, as long as they are disconnected in the population augmentation graph. For example, when the population augmentation graph is composed of m disconnected sub-graphs corresponding to fine-grained classes, this assumption allows the downstream task to have any $r \leq m$ coarse-grained classes containing these fine-grained classes as a sub-partition. Conventional pseudo-labeling algorithms essentially specify an exact alignment between sub-graphs and downstream classes (i.e., r=m). These conventional pseudo-labeling algorithms face this limitation because their analysis involves fitting discrete pseudo-labels on the unlabeled data. Aspects of the present disclosure avoid this difficulty because the present disclosure considers directly learning continuous representations on the unlabeled data.

Figure 6:
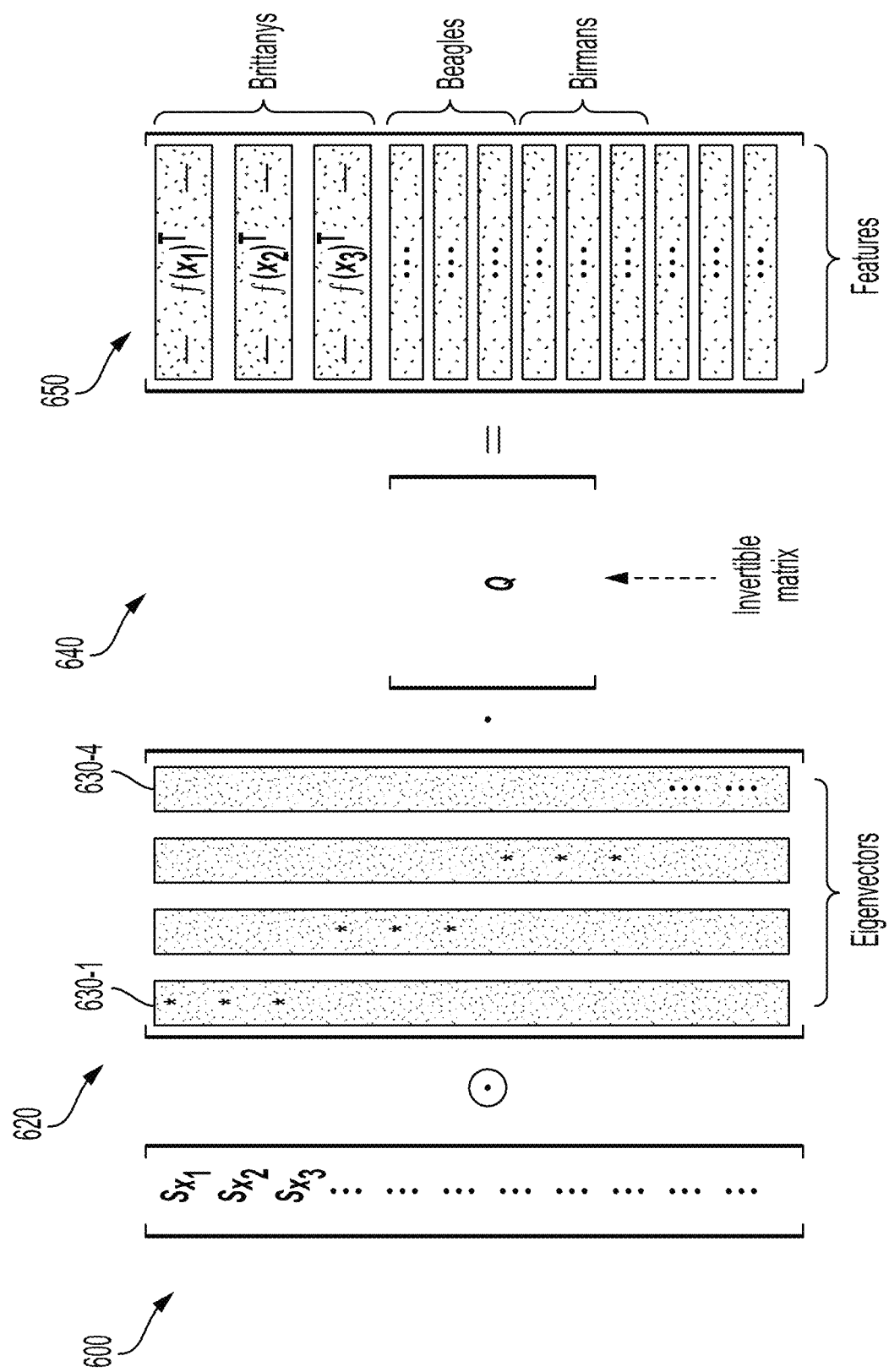
FIG. 6 illustrates a decomposition process of learned representations based on the population augmentation graphs of FIG. 5B, according to aspects of the present disclosure.

FIG. 6 illustrates a decomposition process of learned representations based on population augmentation graphs of FIG. 5B, according to aspects of the present disclosure. The learned representations 650 (e.g., rows of features of Brittanys, Beagles, Birmans in FIG. 6), which are learned by minimizing the population spectral contrastive loss, may be decomposed as the population augmentation graphs of FIGS. 5B and 5C. In this example, the scalars 600 (e.g., $s_{xi}$) are positive for every augmented data-point $x_i$. In aspects of the present disclosure, columns 630 (630-1, ..., 630-4) of the matrix labeled eigenvectors 620 are the top eigenvectors of the normalized adjacency matrix of the population augmentation graphs defined above. The operator (⊙) multiplies row-wise each $s_{xi}$ of the scalars 600 with the $x_i$-th row of the matrix labeled eigenvectors 620. When classes (or sub-classes) are exactly disconnected in the population augmentation graph, the eigenvectors are sparse and align with the sub-class structure. The invertible Q matrix 640 does not affect the performance of the rows under the linear probe.

Given the structure of the population augmentation graphs defined above, spectral decomposition is applied to the population graphs to construct principled embeddings, as shown in FIG. 6. The eigenvalue problems are closely related to graph partitioning, as shown in spectral graph theory for both worst-case graphs and random graphs. In machine learning, spectral clustering is a classical algorithm that learns embeddings by Eigen-decomposition on an empirical distance graph and invoking k-means on the embeddings. Some aspects of the present disclosure apply Eigenvector decomposition to the population augmentation graphs (and then later use linear probe for classification). For example, let $w_x = \Sigma_{x' \in \mathcal{X}} w_{xx'}$ be the total weights associated to x, which is often viewed as an analog of the degree of x in a weighted graph. A central object in spectral graph theory is the so-called normalized adjacency matrix:

$$\bar{A} := D^{-1/2} A D^{-1/2} \quad (3)$$

where $A \in \mathbb{R}^{N \times N}$ is adjacency matrix with entries $A_{xx'} = w_{xx'}$, and $D \in \mathbb{R}^{N \times N}$ is a diagonal matrix with $D_{xx} = w_x$. The matrix A, D by $(x, x') \in \mathcal{X} \times \mathcal{X}$ is indexed. Generally N-dimensional axis by $x \in \mathcal{X}$ is indexed.

Standard spectral graph theory approaches produce vertex embeddings as follows. Let $\gamma_1, \gamma_2, \ldots, \gamma_k$ be the k largest eigenvalues of $\bar{A}$, and $v_1, v_2, \ldots, v_k$ be the corresponding unit-norm eigenvectors. For example, let $F^* = [v_1, v_2, \ldots, v_k] \in \mathbb{R}^{N \times k}$ be the matrix that collects these eigenvectors in columns, and refer to it as the eigenvector matrix. Let $u^*_x \in \mathbb{R}^k$ be the x-th row of the matrix $F^*$. It turns out that $u^*_x$'s can serve as desirable embeddings of x's because they exhibit a clustering structure in Euclidean space that resembles the clustering structure of the graph G ($\mathcal{X}$, w).

From Spectral Decomposition to Spectral Contrastive Learning

The embeddings $u^*_x$ obtained by eigendecomposition are nonparametric—a k-dimensional parameter is provided for every x; therefore, x cannot be learned with a realistic amount of data. The embedding matrix $F^*$ cannot be even store efficiently. Therefore, the rows of the eigenvector matrix $F^*$ are parameterized as a neural network function, and it is assumed embeddings $u^*_x$ can be represented by $f(x)$ for some $f \in \mathcal{F}$, where $\mathcal{F}$ is the hypothesis class containing neural networks. As show below, this assumption enables leveraging the extrapolation power of neural networks and learning the representation on a finite dataset.

Next, a proper loss function is designed for the feature extractor $f$, such that minimizing this loss should recover $F^*$ up to some linear transformation. As show below, the resulting population loss function on $u_x$ also admits an unbiased estimator with finite training samples. Let F be an embedding matrix with $u_x$ on the x-th row, a loss function of F is first designed that can be decomposed into parts about individual rows of F. The following matrix factorization based formulation is employed for eigenvectors. Consider the objective:

$$\min_{F \in \mathbb{R}^{N \times k}} \mathcal{L}_{mf}(F) := \|\bar{A} - FF^\top\|_F^2. \quad (4)$$

By the classical theory on low-rank approximation, any minimizer of $\hat{F}$ of $\mathcal{L}_{mf}(F)$ contains scaling of the largest eigenvectors of $\bar{A}$ up to a right transformation—for some orthonormal matrix $R \in \mathbb{R}^{k \times k}$, $\hat{F} = F^* \cdot \text{diag}([\sqrt{\gamma_1}, \ldots, \sqrt{\gamma_k}])Q$. Fortunately, multiplying the embedding matrix by any matrix on the right and any diagonal matrix on the left does not change its linear probe performance, which is formalized by the following lemma.

Lemma 3.1. Consider an embedding matrix $F \in \mathbb{R}^{N \times k}$ and a linear classifier $B \in \mathbb{R}^{k \times r}$. Let $D \in \mathbb{R}^{N \times N}$ be a diagonal matrix with positive diagonal entries and $Q \in \mathbb{R}^{k \times k}$ be an invertible matrix. Then, for any embedding matrix $\tilde{F} = D \cdot F \cdot Q$, the linear classifier $\tilde{B} = Q^{-1} B$ on $\tilde{F}$ has the same prediction as B on F. As a consequence, it results in:

$$\varepsilon(F) = \varepsilon(\tilde{F}). \quad (5)$$

where $\varepsilon(F)$ denotes the linear probe performance when the rows of F are used as embeddings.

The main benefit of objective $\mathcal{L}_{mf}(F)$ is that it is based on the rows of F. Recall that vectors $u_x$ are the rows of F. Each entry of $FF^T$ is of the form $u_x^T x_{x'}$, and thus $\mathcal{L}_{mf}(F)$ can be decomposed into a sum of $N^2$ terms involving terms $u_x^T u_{x'}$. Interestingly, each row $u_x$ is re-parameterized by $w_x^{1/2} f(x)$. A very similar loss function is obtained for $f$ that resembles the contrastive learning loss, as shown below in Lemma 3.2. For example, FIG. 6 provides an illustration of the relationship between the matrix labeled eigenvectors 620 the invertible Q matrix 640 and the learned representations 650, which are learned by minimizing this loss.

For example, the positive and negative pairs are defined to introduce the loss. Let $\bar{x} \sim \mathcal{P}_{\bar{x}}$ be a random natural data and draw $x \sim \mathcal{A}(\cdot|\bar{x})$ and $x^+ \sim \mathcal{A}(\cdot|\bar{x})$ independently to form a positive pair $(x, x^+)$. Draw and $\bar{x}' \sim \mathcal{P}_{\bar{x}}$ and $x' \sim \mathcal{A}(\cdot|\bar{x})$ independently with $\bar{x}$, x, $x^+$. As described, $(x, x')$ is referred to as a negative pair. Though x and x' are simply two independent draws, they are called negative pairs in practice.

Lemma 3.2 (Spectral contrastive loss). Recall that $u_x$ is the x-th row of F. Let $u_x = w_x^{1/2} f(x)$ be some function for $f$. Then, the loss function $\mathcal{L}_{mf}(F)$ is equivalent to the following loss function for $f$, called spectral contrastive loss, up to an additive constant:

$$\mathcal{L}_{mf}(F) = \mathcal{L}(f) + \text{const}$$

where $\mathcal{L}(f) \triangleq -2 \cdot \mathbb{E}_{x,x^+}[f(x)^T f(x^+)] + \mathbb{E}_{x,x'}[(f(x)^T f(x'))^2]$ (6)

It is noted that the spectral contrastive loss is similar to many popular contrastive losses. For instance, the contrastive loss can be rewritten as (with simple algebraic manipulation):

$$-f(x)^\top f(x^+) + \log\left(\exp(f(x)^\top f(x^+)) + \sum_{i=1}^n \exp(f(x)^\top f(x_i))\right).$$

Here x and $x^+$ are a positive pair and $x_1, \ldots, x_n$ are augmentations of other data. Spectral contrastive loss can be seen as removing $f(x)^T f(x^+)$ from the second term, and replacing the log sum of exponential terms with the average of the squares of $f(x)^T f(x_i)$. Aspects of the present disclosure provide that a spectral contrastive loss has a significant empirical performance without requiring a large batch size.

These aspects of the present disclosure apply spectral decomposition—a classical approach for graph partitioning, also known as spectral clustering in machine learning—to the adjacency matrix defined on the population augmentation graph. Some aspects of the present disclosure form a matrix where the top-k eigenvectors are the columns and interpret each row of the matrix as the representation (in $\mathbb{R}^k$) of an example (see FIG. 6). Somewhat surprisingly, this feature extractor can also be recovered (up to some linear transformation) by minimizing the following population objective which is similar to the standard contrastive loss (See Equation (6)):

$$\mathcal{L}(f) \triangleq -2 \cdot \mathbb{E}_{x,x^+}[f(x)^T f(x^+)] + \mathbb{E}_{x,x'}[(f(x)^T f(x'))^2]$$

where $(x, x^+)$ is a pair of augmentations of the same data, $(x, x')$ is a pair of independently random augmented data, and $f$ is a parameterized function from augmented data to $\mathbb{R}^k$. FIG. 6 illustrates the relationship between the matrix labeled eigenvectors 620, the invertible Q matrix 640, and the learned representations 650 (e.g., rows of features of dog classes). As described, this loss is referred to as the population spectral contrastive loss.

Theoretical Guarantees for Spectral Contrastive Loss on Population Data

Some aspects of the present disclosure are directed to theoretical guarantees for spectral contrastive learning on population data. To formalize the idea that G cannot be partitioned into too many disconnected sub-graphs, the notions of Dirichlet conductance and sparsest m-partition, which are standard in spectral graph theory are introduced. As described, Dirichlet conductance represents the fraction of edges from S to its complement:

Definition 3.3 (Dirichlet conductance). For a graph $G=(\mathcal{X}, w)$ and a subset $S \subseteq \mathcal{X}$, the Dirichlet conductance of S is defined as:

$$\phi_G(S) := \frac{\sum_{x \in S, x' \notin S} w_{xx'}}{\sum_{x \in S} w_x}.$$

It is noted that when S is a singleton, there is $\phi_G(S)=1$ due to the definition of $w_x$. In addition, the sparsest m-partition is introduced to represent the number of edges between m disjoint subsets.

Definition 3.4 (Sparsest m-partition). Let $G=(\mathcal{X}, w)$ be the augmentation graph. For an integer $m \in [2, |\mathcal{X}|]$, the sparsest m-partition is defined as $$\rho_m := \min_{S_1, \ldots, S_m} \max\{\phi_G(S_1), \ldots, \phi_G(S_m)\}$$

where $S_1, \ldots, S_m$ are non-empty sets that form a partition of $\mathcal{X}$.

When r is the number of underlying classes, it may be expected that $\rho_r \approx 0$ because the augmentations from different classes almost compose a disjoint r-way partition of $\mathcal{X}$. However, for $m > r$, $\rho_m$ is expected to be much larger. For instance, in the extreme case when $m=|\mathcal{X}|=N$, every set $S_i$ is a singleton, which implies that $\rho_N=1$.

In some aspects of the present disclosure, the assumption that very few edges cross different ground-truth classes is formalized. It turns out that it suffices to assume that the labels are recoverable from the augmentations (which is also equivalent to the notion that two examples in different classes can rarely be augmented into the same point).

Assumption 3.5 (Labels are recoverable from augmentations). Let $\bar{x} \sim \mathcal{P}_{\overline{\mathcal{X}}}$ and $y(\bar{x})$ be its label. Let the augmentation $x \sim \mathcal{A}(\cdot | \bar{x})$. Assume that there exists a classifier g that can predict $y(\bar{x})$ given x with error at most $\alpha$. That is, $g(x)=y(\bar{x})$ with probability at least $1-\alpha$.

The following assumption is also introduced, which states that some universal minimizer of the population spectral contrastive loss can be realized by the hypothesis class.

Assumption 3.6 (Realizability). Let $\mathcal{F}$ be a hypothesis class containing functions from $\mathcal{X}$ to $\mathbb{R}^k$. Assume that at least one of the global minima of $\mathcal{L}(f)$ belongs to $\mathcal{F}$.

A main theorem bound noted above the linear probe error of the features is learned by minimizing the population spectral contrastive loss.

Theorem 3.7. Assume the representation dimension $k \geq 2r$ and Assumption 3.5 holds for $\alpha > 0$. Let $\mathcal{F}$ be a hypothesis class that satisfies Assumption 3.6 and let $f^*_{pop} \in \mathcal{F}$ be a minimizer of $\mathcal{L}(f)$. Then, $$\varepsilon(f^*_{pop}) \leq \tilde{O}(\alpha / \rho_{\lfloor k/2 \rfloor}^2).$$

In some aspects of the present disclosure, $\tilde{O}(\cdot)$ is used to hide universal constant factors and logarithmic factor in k. According to aspects of the present disclosure, when augmentations from different classes are perfectly disconnected in the augmentation graph, the above theorem guarantees the exact recovery of the ground truth. Generally, $\alpha$ is expected to be an extremely small constant independent of k, whereas $\rho_{\lfloor k/2 \rfloor}$ increases with k and can be much larger than $\alpha$ when k is reasonably large. For instance, when there are t sub-graphs that have sufficient inner connections, expect $\rho_{t+1}$ to be on the order of a constant because any t+1 partition needs to break one sub-graph into two pieces and incur a large conductance. The $\rho_k$'s growth is characterized on more concrete distributions below.

Conventional graph partitioning often analyzes rounding algorithms that conduct clustering based on the representations of unlabeled data and do not analyze the performance of linear probe (which has access to labeled data). These results provide guarantees on the approximation ratio—the ratio between the conductance of the obtained partition to the best partition—which may depend on graph size that can be exponentially large in this setting. The approximation ratio guarantee does not lead to a guarantee on the representations' performance on downstream tasks. The guarantees are on the linear probe accuracy on the downstream tasks and independent of the graph size. The formulation of the downstream task's labeling function (Assumption 3.5) is relied on as well as a novel analysis technique that characterizes the linear structure of the representations. The proof of Theorem 3.7 as well as its more generalized version where k/2 is relaxed to be any constant fraction of k is provided.

Provable Instantiation of Theorem 3.7 to Mixture of Manifold Data

In this description, Theorem 3.7 is exemplified on an example where the natural data distribution is a mixture of manifolds, and the augmentation transformation adds Gaussian noise.

Example 3.8 (Mixture of manifolds). Suppose $\mathcal{P}_{\overline{\mathcal{X}}}$ is a mixture of $r \leq d$ distributions $P_1, \ldots, P_r$, where each $P_i$ is generated by some k-bi-Lipschitz generator $Q: \mathbb{R}^{d'} \to \mathbb{R}^d$ on some latent variable $z \in \mathbb{R}^{d'}$ with $d' \leq d$ which as a mixture of Gaussian distribution:

$$x \sim P_i \Leftrightarrow x = Q(z), z \sim \mathcal{N}\left(\mu_i, \frac{1}{d'} \cdot I_{d' \times d'}\right).$$

Let the data augmentation of a natural data sample $\bar{x}$ is $\bar{x}+\xi$ where $$\xi \sim \mathcal{N}\left(0, \frac{\sigma^2}{d} \cdot I_{d \times d}\right)$$

is isotropic Gaussian noise with $$0 < \sigma \leq \frac{1}{\sqrt{d}}.$$

It is also assumed $$\min_{i \neq j} \|\mu_i - \mu_{j\sim}\|_2 \gtrsim \frac{k \cdot \sqrt{\log d}}{\sqrt{d'}}.$$

A $\kappa$ bi-Lipschitz function satisfies $$\frac{1}{\kappa}\|f(x) - f(y)\|_2 \leq (x)\|x - y\|_2 \leq \kappa\|f(x) - f(y)\|_2.$$

Let the ground-truth label be the most likely mixture index i that generates x:y(x):=argmax$_i P_i$(x). It is noted that the intra-class distance in the latent space is on the scale of $\Omega(1)$, which can be much larger than the distance between class means which is assumed to be $$\gtrsim \frac{k \cdot \sqrt{\log d}}{\sqrt{d'}}.$$

Therefore, distance-based clustering algorithms do not apply. Theorem 3.7 is applied to generate the following theorem:

Theorem 3.9. When k≥2r+2, Example 3.8 satisfied Assumption 3.5 with $$\alpha \leq \frac{1}{\text{poly}(d)},$$

and has $$\rho_{\lfloor k/2 \rfloor} \gtrsim \frac{\sigma}{k\sqrt{d}}.$$

As a consequence, the error bound is $$\varepsilon(f_{pop}^*) \leq \tilde{O}\left(\frac{k^2}{\sigma^2 \cdot \text{poly}(d)}\right).$$

Theorem 3.9 guarantees a small error even when $\sigma$ is polynomially small. In this case, the augmentation noise has a much smaller scale than the data (which is at least on the order of 1/k). This suggests that contrastive learning can non-trivially leverage the structure of the underlying data and learn good representations with relatively weak augmentation.

Some aspects of the present disclosure analyze the linear classification performance of the representations learned by minimizing the population spectral contrastive loss. As described above, Theorem 3.7 shows that when the representation dimension exceeds the maximum number of disconnected sub-graphs, linear classification with learned representations is guaranteed to have a small error. This theorem reveals a trend that a larger representation dimension is needed when there are a larger number of disconnected sub-graphs. These aspects of the present disclosure rely on novel techniques tailored to linear probe performance, which have not been studied in the spectral graph theory community.

Finite-Sample Generalization Bounds

As noted above, some aspects of the present disclosure provide guarantees for spectral contrastive learning on population data. In this section, it is shown that these guarantees can be naturally extended to the finite-sample regime with standard concentration bounds. In particular, given a training dataset $\{\bar{x}_1, \bar{x}_2, \ldots, \bar{x}_n\}$ with $\bar{x}_1 \sim \mathcal{P}_{\overline{\mathcal{X}}}$. A feature extractor is learned by minimizing the following empirical spectral contrastive loss:

$$\hat{\mathcal{L}}_n(f) := -\frac{2}{n}\sum_{i=1}^{n} \mathbb{E}_{\substack{x \sim \mathcal{A}(\cdot|\bar{x}_i) \\ x^+ \sim \mathcal{A}(\cdot|\bar{x}_i)}} [f(x)^\top f(x^+)]x +$$

$$\frac{1}{n(n-1)}\sum_{i \neq j} \mathbb{E}_{\substack{x \sim \mathcal{A}(\cdot|\bar{x}_i) \\ x' \sim \mathcal{A}(\cdot|\bar{x}_j)}} [(f(x)^\top f(x'))^2].$$

It is worth noting that $\hat{\mathcal{L}}_n(f)$ is an unbiased estimator of the population spectral contrastive loss $\mathcal{L}(f)$. Therefore, generalization bounds can be derived via off-the-shelf concentration inequalities. Let $\mathcal{F}$ be a hypothesis class containing feature extractors from $\mathcal{X}$ to $\mathbb{R}^k$. The Rademacher complexity is extended to function classes with high-dimensional outputs and the Rademacher complexity of $\mathcal{F}$ on n data is defined as $$\hat{\mathcal{R}}_n(\mathcal{F}) := \max_{x_1, \ldots, x_n \in \mathcal{X}} \mathbb{E}_\sigma\left[\sup_{f \in \mathcal{F}, i \in [k]} \frac{1}{n}\left(\sum_{j=1}^{n} \sigma_j f_i(x_j)\right)\right],$$

where $\sigma$ is a uniform random vector in $\{-1, 1\}^n$ and $f_i(z)$ is the i-th dimension of $f(z)$.

In the previous description, $f^*_{pop} \in \mathcal{F}$ is a minimizer of $\mathcal{L}(f)$. The following theorem bounds the population loss of a feature extractor trained with finite data:

Theorem 4.1. For some $\kappa > 0$, assume $\|f(x)\|_\infty \leq K$ for all $f \in \mathcal{F}$ and $x \in \mathcal{X}$. Let $f^*_{pop} \in \mathcal{F}$ be a minimizer of the population loss $\mathcal{L}(f)$. Given a random dataset of size n, let $\hat{f}_{emp} \in \mathcal{F}$ be a minimizer of empirical loss $\hat{\mathcal{L}}_n(f)$. Then, with probability at least 1−δ over the randomness of data, it results in $$\mathcal{L}(\hat{f}_{emp}) \leq \mathcal{L}(f^*_{pop}) + c_1 \cdot \hat{\mathcal{R}}_{n/2}(\mathcal{F}) + c_2 \cdot \left(\sqrt{\frac{\log 2/\delta}{n}} + \delta\right),$$

where constants $c_1 \lesssim k^2\kappa^2 + k\kappa$ and $c_2 \lesssim k\kappa^2 + k^2\kappa^4$.

The theorem above shows that near-optimal population loss may be achieved by minimizing empirical loss up to some small excess loss. The following theorem characterizes how the error propagates to the linear probe performance mildly under some spectral gap conditions.

Theorem 4.2. Assume representation dimension k≥4r+2, Assumption 3.5 holds for α>0 and Assumption 3.6 holds. Recall $\gamma_i$ is the i-th largest eigenvalue of the normalized adjacency matrix. Then, for any $\epsilon<\gamma_k^2$ and $\hat{f}_{emp}\in\mathcal{F}$ such that $\mathcal{L}(f_{emp})<\mathcal{L}(f^*_{pop})+\epsilon$, it results in:

$$\varepsilon(\hat{f}_{emp}) \lesssim \frac{\alpha}{\rho_{\lfloor k/2 \rfloor}^2} \cdot \log k + \frac{k\epsilon}{\Delta_\gamma^2},$$

where $\Delta_\gamma := \gamma_{\lfloor 3k/4 \rfloor} - \gamma_k$ is the eigenvalue gap between the $\lfloor 3k/4 \rfloor$-th and the k-th eigenvalue.

This theorem shows that the error on the downstream task grows linearly with the error ϵ during pre-training. Assumption 3.6 may be relaxed to approximate realization in the sense that $\mathcal{F}$ contains some sub-optimal feature extractor under the population spectral loss and pay an additional error term in the linear probe error bound. According to aspects of the present disclosure, spectral contrastive loss also works on empirical data. Because this spectral contrastive loss approach optimizes parametric loss functions, guarantees involving the population loss can be converted to finite sample results using off-the-shelf generalization bounds. The sample complexity is polynomial in the Rademacher complexity of the model family and other relevant parameters (e.g., Theorem 4.1 and Theorem 4.2).

Guarantee for Learning Linear Probe with Labeled Data

These aspects of the present disclosure provide theoretical guarantees for learning a linear probe with labeled data. Theorem 3.7 guarantees the existence of a linear probe that achieves a small downstream classification error. Nevertheless, a priori it is unclear how large the margin of the linear classifier can be, so it is hard to apply margin theory to provide generalization bounds for 0-1 loss. In principle, the margin of the linear head may be controlled, but using capped quadratic loss turns out to suffice and be mathematically more convenient. These aspects of the present disclosure learn a linear head with the following capped quadratic loss: given a tuple (z, y($\bar{x}$)) where $z\in\mathbb{R}^k$ is a representation of augmented data $x\sim\mathcal{A}(\cdot|\bar{x})$ and $y(\bar{x})\in|r|$ is the label of $\bar{x}$, for a linear probe $B\in\mathbb{R}^{k\times r}$ loss $\ell((z, y(\bar{x})), B):=\Sigma_{i=1}^r \min\{(B^T z - \vec{y}(\bar{x})_i)^2, 1\}$, is defined, where $\vec{y}(\bar{x})$ is the one-hot embedding y($\bar{x}$) as an r-dimensional vector (1 on the y($\bar{x}$)-th dimension, 0 on other dimensions). This is a standard modification of quadratic loss in statistical learning theory that ensures the boundedness of the loss for the ease of analysis.

The following Theorem 5.1 provides a generalization guarantee for the linear classifier that minimizes capped quadratic loss on a labeled dataset. The key challenge of the proof is showing the existence of a small-norm linear head B that gives small population quadratic loss, which is not obvious from Theorem 3.7 where only small 0-1 error is guaranteed. Recall $\gamma_i$ is the i-th largest eigenvalue of the normalized adjacency matrix. Given a labeled dataset $\{(\bar{x}_i, y(\bar{x}_i))\}_{i=1}^n$ where $\bar{x}_i\sim\mathcal{P}_{\bar{x}}$ and y($\bar{x}_i$) is its label, $x_i\sim\mathcal{A}(\cdot|\bar{x}_i)$ for $i\in[n]$ is sampled.

Theorem 5.1. In the setting of Theorem 3.7, assume $\gamma_k \geq C_\lambda$ for some $C_\lambda>0$. Learn a linear probe $\hat{B}\in\text{argmin}_{\|B\|_F\leq 1/C_\lambda}\Sigma_{i=1}^n \ell((f^*_{pop}(x_i), y(\bar{x}_i), B)$ by minimizing the capped quadratic loss subject to a norm constraint. Then, with probability at least 1−δ over random data, it results in $$\Pr_{\bar{x}\sim\mathcal{P}_{\bar{x}}}\left(g_{f^*_{pop},\hat{B}}(\bar{x}) \neq y(\bar{x})\right) \lesssim \frac{\alpha}{\rho_{\lfloor k/2 \rfloor}^2} \cdot \log k + \frac{r}{C_\lambda}\cdot\sqrt{\frac{k}{n}} + \sqrt{\frac{\log 1/\delta}{n}}.$$

Here the first term is the population error from Theorem 3.7. The last two terms are the generalization gap from standard concentration inequalities for linear classification and are small when the number of labeled data n is polynomial in the feature dimension k. It is noted that this result reveals a tradeoff when choosing the feature dimension k: when n is fixed, a larger k decreases the population contrastive loss while increasing the generalization gap for downstream linear classification.

According to aspects of the present disclosure, the following theoretical contributions are provided: 1) a simple contrastive loss motivated by spectral decomposition of the population data graph is proposed, 2) under simple and realistic assumptions, downstream classification guarantees are provided for the representation learned by minimizing this loss on population data, and 3) the described analysis is easily applicable to deep networks with polynomial unlabeled samples via off-the-shelf generalization bounds.

Pedestrian Crossing Scenario

Figure 7:
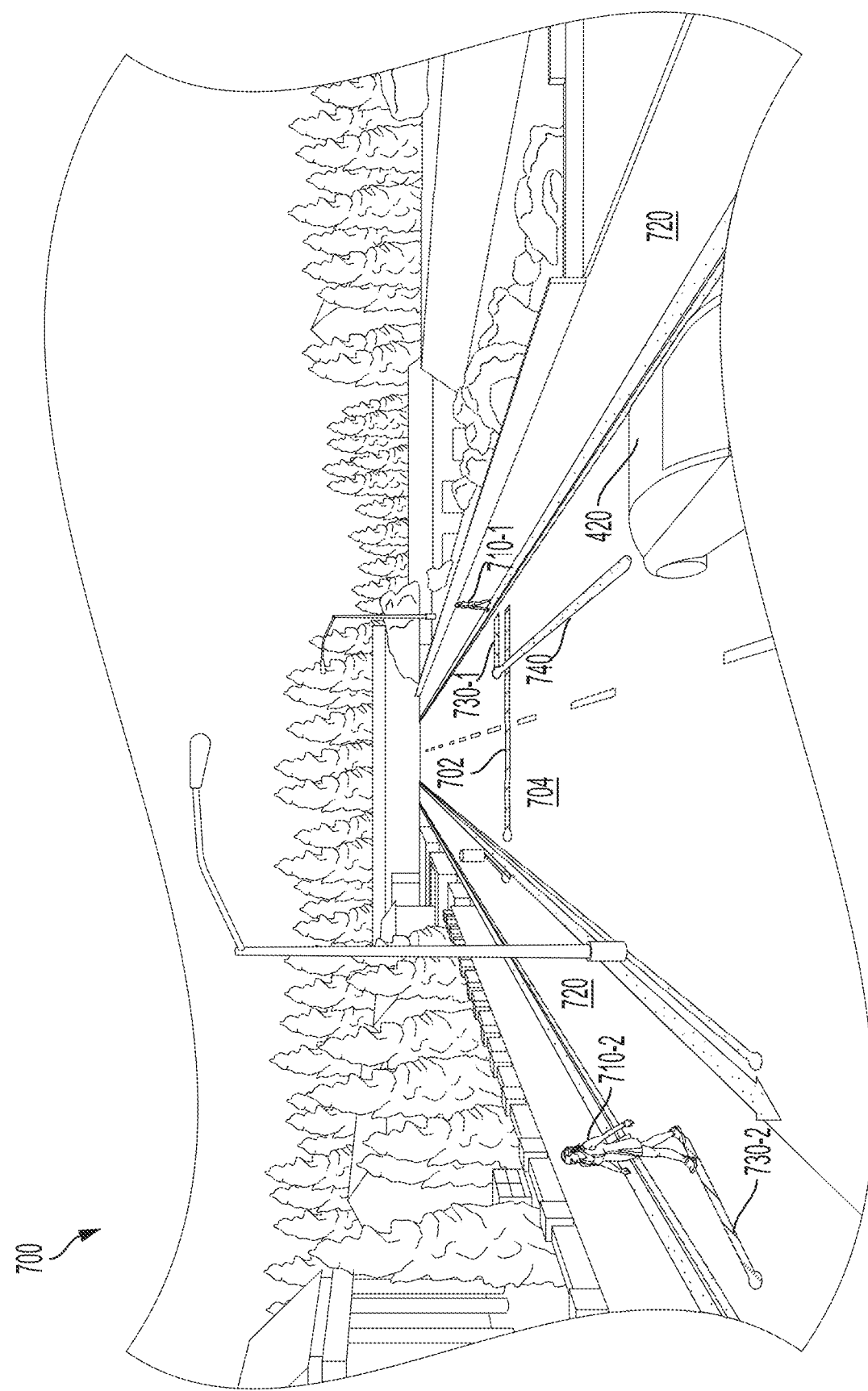
FIG. 7 is a drawing of a roadway environment illustrating a pedestrian crossing scenario relative to an ego vehicle approaching a crosswalk in which a collision is predicted by the ego vehicle, according to aspects of the present disclosure.

FIG. 7 is a drawing of a roadway environment 700 illustrating a pedestrian crossing scenario relative to an ego vehicle 420 approaching a crosswalk 702, in which a collision is predicted by the ego vehicle 420, according to aspects of the present disclosure. In this scenario, an ego vehicle 420 is driving along a road 704 with many pedestrians 710 nearby. The pedestrians 710 are generally walking along on a sidewalk 720, and some cross the road 704. In this example, the pedestrians 710 walk at different speeds (e.g., between 0-2 m/s) on the sidewalk 720, walk around each other to avoid collisions, sometimes pausing outside shops, and sometimes crossing the road.

In the pedestrian prediction scenario shown in FIG. 7, pedestrians 710 spawn on the sidewalk 720 and the ego vehicle 420 predicts the pedestrian trajectories 730 (e.g., 730-1 and 730-2) within the next 3 seconds. Some of the pedestrians 710 may cross the road 704 at right angles, as shown by a crossing pedestrian trajectory 730-1. In this example, a planner of the ego vehicle 420 predicts a collision with a crossing pedestrian 710 and starts slowing down, as shown by an ego trajectory prediction 740 up to the crossing pedestrian trajectory 730-1, but not further.

As shown in FIG. 7, the crossing pedestrian 710-1 randomly decides to cross the road 704 at the crosswalk 702 and does so quickly (e.g., 2 m/s) in the shortest path possible (perpendicular to the road direction). In this example, the ego vehicle 420 is approaching the crosswalk 702, in which a collision is predicted by the ego vehicle 420 with the crossing pedestrian 710-1 unless the ego vehicle 420 performs the action of applying the brakes.

Figure 8:
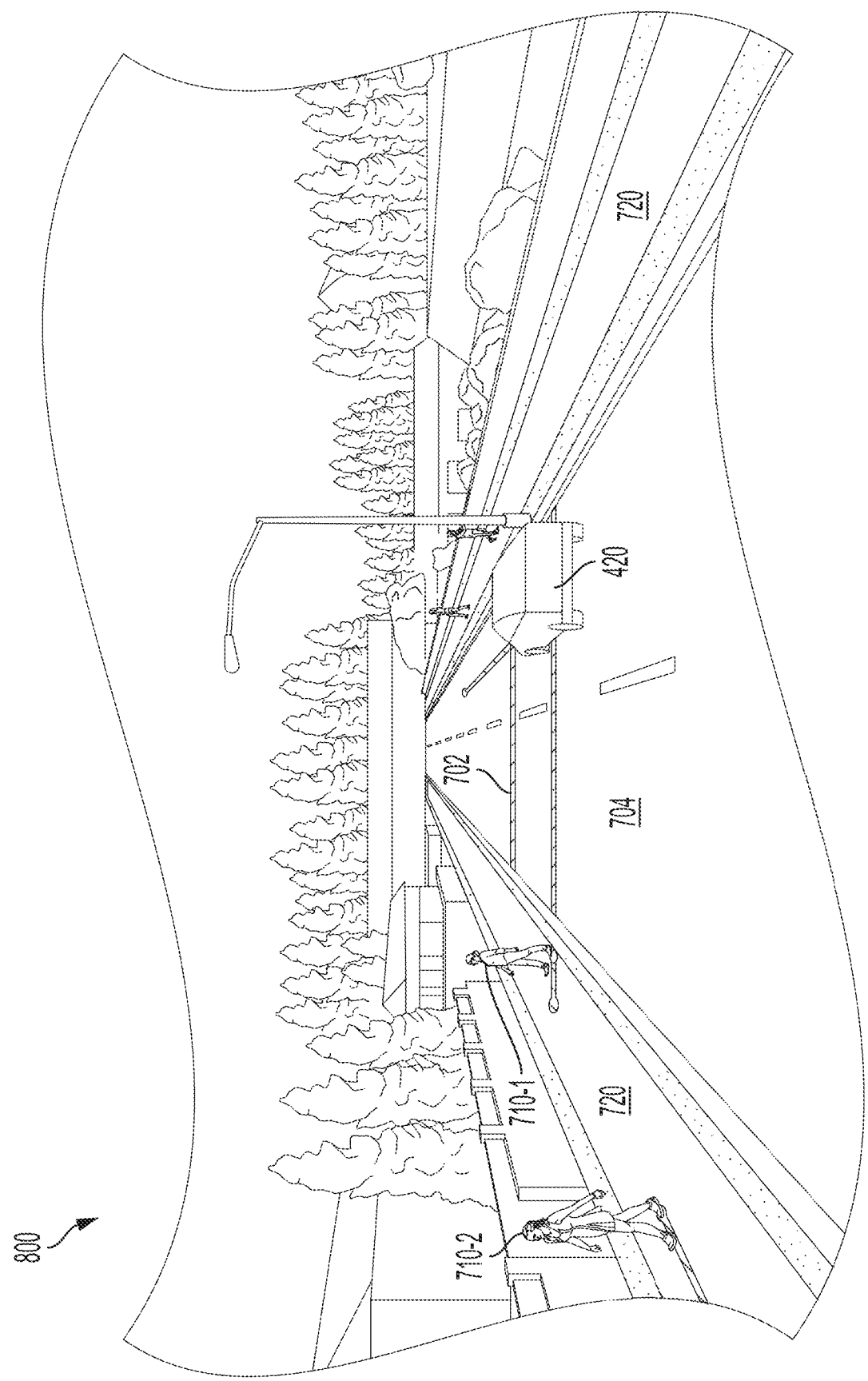
FIG. 8 is a drawing of the roadway environment illustrating the pedestrian crossing scenario relative to the ego vehicle approaching the crosswalk of FIG. 7, in which no collision is predicted by the ego vehicle, according to aspects of the present disclosure.

FIG. 8 is a drawing of a roadway environment 800 illustrating the pedestrian crossing scenario relative to an ego vehicle approaching the crosswalk of FIG. 7, in which no collision is predicted by the ego vehicle, according to aspects of the present disclosure. In this example, no collision is predicted because the crossing pedestrian 710-1 has crossed the crosswalk 702. These aspects of the present disclosure provide a control-aware prediction objective model that recognizes only the (simple) road-crossing behavior is important to model. All the (complex) sidewalk motions, such as a second pedestrian 710-2 are not important with respect to planning of the ego vehicle 420. A vehicle action planner of the ego vehicle 420 may be trained using self-supervised deep learning based on images including ground-truth labels according to a process, for example, as shown in FIG. 9.

Figure 9:
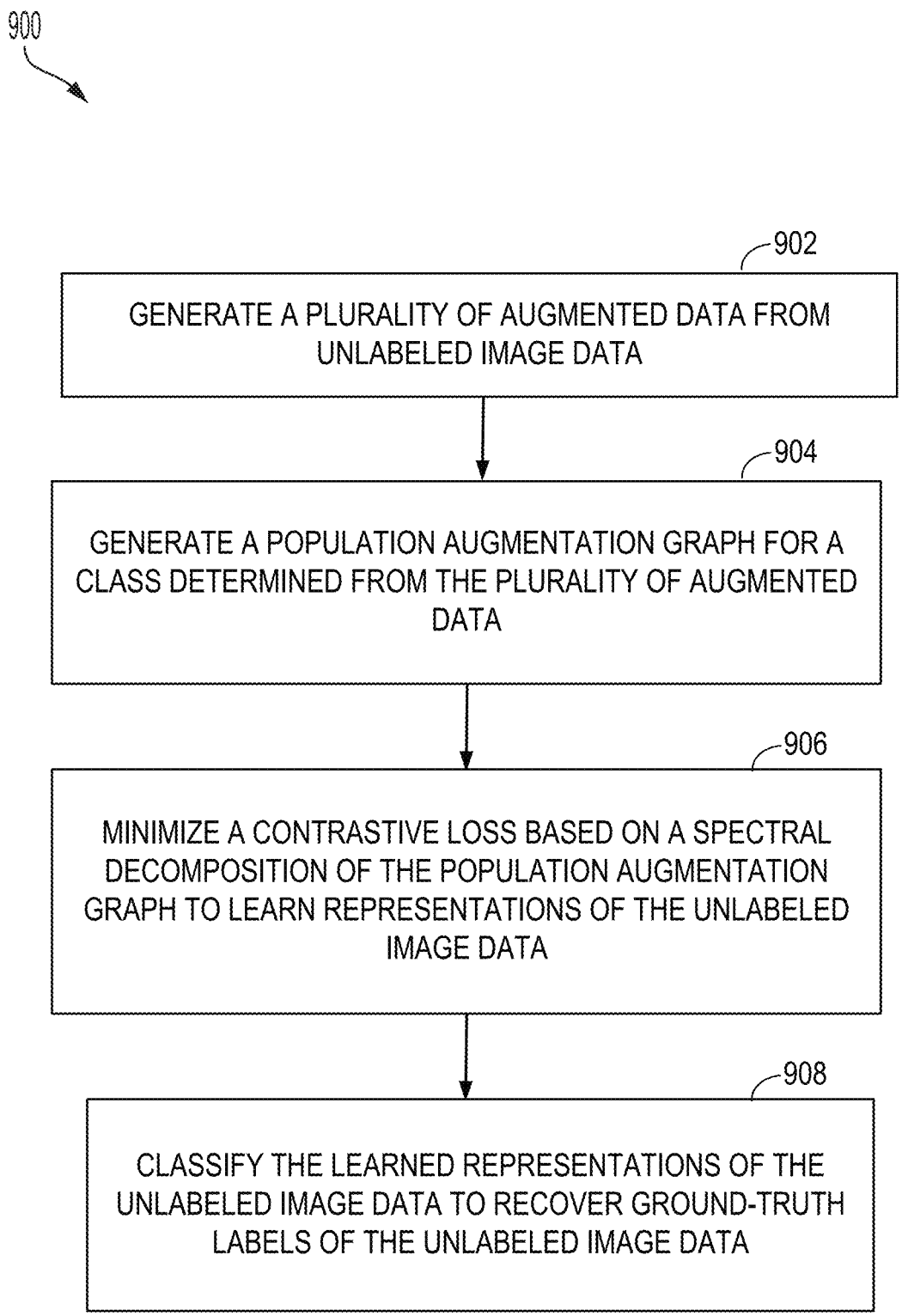
FIG. 9 is a flowchart illustrating a method for self-supervised learning according to aspects of the present disclosure.

FIG. 9 is a flowchart illustrating a method for self-supervised learning according to aspects of the present disclosure. A method 900 being at block 902, in which a plurality of augmented data from unlabeled image data is generated. For example, as shown in FIG. 3, the data augmentation module 312 may be configured to generate a set of augmented data from unlabeled image data, for example, captured by the vehicle perception module 302. For example, the data augmentation module 312 may process a polynomial number of unlabeled data samples. In FIG. 5A, the natural data 500 is processed to generate an augmented data 550. In this example, the augmented data 550 includes a first augmented data 552, a second augmented data 554, a third augmented data 555, a fourth augmented data 556, and a fifth augmented data 558.

At block 904, a population augmentation graph is generated for a class determined from the plurality of augmented data. For example, as shown in FIG. 3, the data augmentation module 312 may process a polynomial number of unlabeled data samples. The population augmentation graph module 314 is configured to generate a population augmentation graph for a class determined from the plurality of augmented data. As shown in FIG. 5B, the augmentation graphs 560 include a Husky augmentation graph 562, a Beagle augmentation graph 564, and a Brittany augmentation graph 570 for a dog class. According to some aspects of the present disclosure, two of the augmented data 550 are connected in one of the population augmentation graphs if they are views of the same natural data-point.

At block 906, a contrastive loss is minimized based on a spectral decomposition of the population augmentation graph to learn representations of the unlabeled image data. For example, as shown in FIG. 3, the spectral contrastive loss model 316 is configured to minimize a contrastive loss based on a spectral decomposition of the population augmentation graph to learn representations of the unlabeled image data. Some aspects of the present disclosure describe a particular formulation of a loss value for contrastive learning. In particular, some aspects of the present disclosure discuss a contrastive learning paradigm, which learns representations by pushing positive pairs (or similar examples from the same class) closer together, while keeping negative pairs far apart. These aspects of the present disclosure analyze contrastive learning without assuming conditional independence of the positive pairs using the novel concept of an augmentation graph on data. For example, edges in this augmentation graph connect augmentations of the same data, and ground-truth classes naturally form connected sub-graphs of the augmentation graph, as shown in FIG. 6.

At block 908, the learned representations of the unlabeled image data are classified to recover ground-truth labels of the unlabeled image data. For example, as shown in FIG. 3, the ground-truth label recovery module 318 is configured to classify the learned representations of the unlabeled image data from the spectral contrastive loss model 316 to recover ground-truth labels of the unlabeled image data. Under a simple and realistic data assumption, the ground-truth label recovery module 318 may apply linear classification using representations learned on a polynomial number of unlabeled data samples to recover the ground-truth labels of the data with high accuracy. As shown in FIG. 6, The learned representations 650 (e.g., rows of features of Brittanys, Beagles, Birmans in FIG. 6), which are learned by minimizing the population spectral contrastive loss, may be decomposed as the population augmentation graphs of FIGS. 5B and 5C.

The method 900 also includes training a motion prediction model of an ego vehicle based on the ground-truth labels of the unlabeled image data to form a trained, motion prediction model. The method 900 further includes selecting a vehicle control action of the ego vehicle in response to a predicted motion from the trained, motion prediction model. The method 900 also includes performing the vehicle control action to maneuver the ego vehicle according to a predicted motion of detected pedestrian agents within a traffic environment of the ego vehicle. For example, the vehicle control action may include throttling, steering, and/or braking of the ego vehicle. The method 900 also includes pre-training a neural network to extract a compressed numerical representation of the unlabeled image data for a downstream task. The downstream task may include image labeling, object detection, scene understanding, and/or visuomotor policies.

Aspects of the present disclosure are directed to applications of contrastive learning without assuming conditional independence of positive pairs using a population augmentation graph from unlabeled data. In some aspects of the present disclosure, edges of the augmentation graph connect augmentations of the same data, and ground-truth classes naturally form connected sub-graphs. Some aspects of the present disclosure propose a loss that performs spectral decomposition on a population augmentation graph, which may be succinctly written as a contrastive learning objective using neural network representations. Minimizing this objective leads to features with provable accuracy guarantees under linear probe evaluation. These accuracy guarantees also hold when minimizing the training contrastive loss by standard generalization bounds. In all, these aspects of the present disclosure provide a provable analysis for contrastive learning where the guarantees can apply to realistic empirical settings.

In some aspects, the methods shown in FIG. 9 may be performed by the SOC 100 (FIG. 1) or the software architecture 200 (FIG. 2) of the autonomous vehicle 150. That is, each of the elements or method may, for example, but without limitation, be performed by the SOC 100, the software architecture 200, the processor (e.g., CPU 102) and/or other components included therein of the autonomous vehicle 150, or the vehicle action planner system 300.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for self-supervised learning, comprises:
generating a plurality of augmented data from unlabeled image data;
generating a population augmentation graph for a class determined from the plurality of augmented data;
minimizing a contrastive loss based on a spectral decomposition of the population augmentation graph to learn representations of the unlabeled image data;
classifying the learned representations of the unlabeled image data to recover ground-truth labels of the unlabeled image data by leveraging a ground-truth class that forms a connected sub-graph of the population augmentation graph for the determined class to predict the ground-truth labels of the unlabeled image data;
training a motion prediction model of a vehicle based on the ground-truth labels of the unlabeled image data; and
performing a vehicle control action to prevent a collision of the vehicle when the motion prediction model predicts a pedestrian to enter an upcoming crosswalk in an upcoming period of time.

2. The method of claim 1, in which generating the plurality of augmented data comprises producing multiple views of the unlabeled image data using data augmentation.

3. The method of claim 1, in which generating the population augmentation graph comprises sampling the plurality of augmented data generated from the unlabeled image data to implicitly generate a subset of the population augmentation graph.

4. The method of claim 1, in which classifying comprises applying linear classification to the learned representations of the unlabeled image data to recover the ground-truth labels of the unlabeled image data.

5. The method of claim 1, in which the contrastive loss comprises a spectral contrastive loss.

6. The method of claim 1, further comprising pre-training a neural network to extract a compressed numerical representation of the unlabeled image data for a downstream task.

7. The method of claim 6, in which the downstream task comprises image labeling, object detection, scene understanding, and/or visuomotor policies.

8. A non-transitory computer-readable medium having program code recorded thereon for self-supervised learning, the program code being executed by a processor and comprising:
program code to generate a plurality of augmented data from unlabeled image data;
program code to generate a population augmentation graph for a class determined from the plurality of augmented data;
program code to minimize a contrastive loss based on a spectral decomposition of the population augmentation graph to learn representations of the unlabeled image data;
program code to classify the learned representations of the unlabeled image data to recover ground-truth labels of the unlabeled image data by leveraging a ground-truth class that forms a connected sub-graph of the population augmentation graph for the determined class to predict the ground-truth labels of the unlabeled image data;

program code to train a motion prediction model of a vehicle based on the ground-truth labels of the unlabeled image data; and program code to perform a vehicle control action to prevent a collision of the vehicle when the motion prediction model predicts a pedestrian to enter an upcoming crosswalk in an upcoming period of time.

9. The non-transitory computer-readable medium of claim 8, in which the program code to generate the plurality of augmented data comprises program code to produce multiple views of the unlabeled image data using data augmentation.

10. The non-transitory computer-readable medium of claim 8, in which the program code to generate the population augmentation graph comprises program code to sample the plurality of augmented data generated from the unlabeled image data to implicitly generate a subset of the population augmentation graph.

11. The non-transitory computer-readable medium of claim 8, in which the program code to classify comprises program code to apply linear classification to the learned representations of the unlabeled image data to recover the ground-truth labels of the unlabeled image data.

12. The non-transitory computer-readable medium of claim 8, in which the contrastive loss comprises a spectral contrastive loss.

13. The non-transitory computer-readable medium of claim 8, further comprising program code to pre-train a neural network to extract a compressed numerical representation of the unlabeled image data for a downstream task.

14. The non-transitory computer-readable medium of claim 13, in which the downstream task comprises image labeling, object detection, scene understanding, and/or visuomotor policies.

15. A system for self-supervised learning, the system comprising:

a data augmentation module to generate a plurality of augmented data from unlabeled image data;

a population augmentation graph module to generate a population augmentation graph for a class determined from the plurality of augmented data;

a contrastive loss model to minimize a contrastive loss based on a spectral decomposition of the population augmentation graph to learn representations of the unlabeled image data;

a ground-truth label recovery module to classify the learned representations of the unlabeled image data to recover ground-truth labels of the unlabeled image data by leveraging a ground-truth class that forms a connected sub-graph of the population augmentation graph for the determined class to predict the ground-truth labels of the unlabeled image data;

a motion prediction model of a vehicle trained based on the ground-truth labels of the unlabeled image data; and a controller to perform a vehicle control action to prevent a collision of the vehicle when the motion prediction model predicts a pedestrian to enter an upcoming crosswalk in an upcoming period of time.

16. The system of claim 15, in which the population augmentation graph module is further to generate the population augmentation graph comprising program code to sample the plurality of augmented data generated from the unlabeled image data to implicitly generate a subset of the population augmentation graph.

17. The system of claim 15, in which the ground-truth label recovery module is further to apply linear classification to the learned representations of the unlabeled image data to recover the ground-truth labels of the unlabeled image data.

* * * * *